United States Patent
McClusky et al.

(10) Patent No.: US 11,379,538 B1
(45) Date of Patent: Jul. 5, 2022

(54) SYSTEMS AND METHODS FOR AUTOMATICALLY IDENTIFYING UNMET TECHNICAL NEEDS AND/OR TECHNICAL PROBLEMS

(71) Applicant: Newry Corp., Lakewood, OH (US)

(72) Inventors: Mark Daniel McClusky, Rocky River, OH (US); David Scott Wylie, Lakewood, OH (US); Matthew Donald McClusky, Westlake, OH (US); Emily Elizabeth McClusky, Westlake, OH (US); Jonathan Nathaniel Fegely, Lakewood, OH (US)

(73) Assignee: Artemis Intelligence LLC, Lakewood, OH (US)

( * ) Notice: Subject to any disclaimer, the term of this patent is extended or adjusted under 35 U.S.C. 154(b) by 0 days.

(21) Appl. No.: 15/488,675

(22) Filed: Apr. 17, 2017

Related U.S. Application Data

(60) Provisional application No. 62/338,785, filed on May 19, 2016.

(51) Int. Cl.
*G06F 16/93* (2019.01)
*G06N 3/08* (2006.01)

(52) U.S. Cl.
CPC .............. *G06F 16/93* (2019.01); *G06N 3/08* (2013.01)

(58) Field of Classification Search
CPC ............................. G06F 11/3452; G06N 3/08
See application file for complete search history.

(56) References Cited

U.S. PATENT DOCUMENTS

| 5,371,673 | A | 12/1994 | Fan |
| 5,907,840 | A | 5/1999 | Evans |
| 6,078,914 | A | 6/2000 | Redfern |
| 6,088,692 | A | 7/2000 | Driscoll |

(Continued)

FOREIGN PATENT DOCUMENTS

| WO | 200237447 A2 | 5/2002 |
| WO | 2011025162 A2 | 3/2011 |

OTHER PUBLICATIONS

Shneiderman—Dynamic Queries for Visual Information Seeking, Software, IEEE; 1994; vol. 11; Issue: 6; pp. 70-77; DOI: 10.1109/52.329404.

(Continued)

*Primary Examiner* — Irete F Ehichioya
*Assistant Examiner* — Ken Hoang
(74) *Attorney, Agent, or Firm* — Calfee, Halter & Griswold LLP

(57) ABSTRACT

Systems and methods are provided for automatically identifying and displaying unmet technical needs and/or technical problems, such as identifying and displaying serious technical issues in specific areas of technology. In some exemplary embodiments, the text of technical documents is automatically analyzed to determine whether the text of any document identifies or potentially identifies a technical problem. In exemplary embodiments, portions of a documents called "problem kernels" and their associated features are automatically identified, automatically scored, and automatically ranked, and a subset of the problem kernels and/or features of problem kernels are displayed to a user on a computer display.

15 Claims, 16 Drawing Sheets

(56) References Cited

U.S. PATENT DOCUMENTS

| | | | |
|---|---|---|---|
| 6,473,730 B1* | 10/2002 | McKeown | G06F 17/2705 |
| | | | 704/9 |
| 7,386,535 B1 | 6/2008 | Kalucha et al. | |
| 7,505,964 B2 | 3/2009 | Tong et al. | |
| 7,599,922 B1 | 10/2009 | Chen et al. | |
| 7,739,104 B2 | 6/2010 | Berkan et al. | |
| 7,752,204 B2 | 7/2010 | Kao et al. | |
| 8,037,062 B2 | 10/2011 | Baris et al. | |
| 8,086,601 B2 | 12/2011 | Kim et al. | |
| 8,126,883 B2 | 2/2012 | Qiu | |
| 8,145,617 B1 | 3/2012 | Verstak et al. | |
| 8,438,142 B2 | 5/2013 | Wu et al. | |
| 8,442,972 B2 | 5/2013 | Ismalon | |
| 8,589,373 B2 | 11/2013 | Mayer | |
| 8,606,796 B2 | 12/2013 | Martin et al. | |
| 8,631,001 B2 | 1/2014 | Lawrence et al. | |
| 8,650,186 B2 | 2/2014 | Beck et al. | |
| 8,700,620 B1 | 4/2014 | Lieberman | |
| 8,825,515 B1 | 9/2014 | Hanson | |
| 8,874,569 B2 | 10/2014 | Miller et al. | |
| 8,909,627 B1 | 12/2014 | Popovici et al. | |
| 8,965,882 B1 | 2/2015 | Popovici et al. | |
| 8,965,904 B2 | 2/2015 | Dinh et al. | |
| 8,977,953 B1 | 3/2015 | Pierre et al. | |
| 9,058,394 B2 | 6/2015 | Franks et al. | |
| 9,177,319 B1* | 11/2015 | Chheda | G06Q 30/016 |
| 9,542,259 B1* | 1/2017 | McEwen | G06F 11/0793 |
| 10,331,681 B1 | 6/2019 | Chen et al. | |
| 2003/0115191 A1 | 6/2003 | Copperman et al. | |
| 2003/0130837 A1 | 7/2003 | Batchilo et al. | |
| 2006/0053098 A1 | 3/2006 | Gardner et al. | |
| 2006/0265646 A1* | 11/2006 | Girolami Rose | G06F 17/273 |
| | | | 715/202 |
| 2008/0098300 A1 | 4/2008 | Corrales et al. | |
| 2009/0150827 A1 | 6/2009 | Meyer et al. | |
| 2009/0240685 A1 | 9/2009 | Costello et al. | |
| 2014/0201203 A1 | 7/2014 | Krishna et al. | |
| 2014/0358890 A1 | 12/2014 | Chen et al. | |
| 2015/0294017 A1* | 10/2015 | Zhang | G06F 17/30675 |
| | | | 707/730 |
| 2015/0356270 A1* | 12/2015 | Devarakonda | G16H 15/00 |
| | | | 705/3 |
| 2016/0239487 A1* | 8/2016 | Potharaju | G06F 16/24578 |
| 2016/0301771 A1* | 10/2016 | Choudhari | H04L 67/306 |

OTHER PUBLICATIONS

Lee, et al.—Document Ranking and the Vector-Space Model, Software, IEEE; 1997; vol. 14; Issue: 2; pp. 67-75, DOI: 10.1109/52.582976.

Kaszkiel et al.—Efficient Passage Ranking for Document Databases, Sep. 1999 ACM Transactions on Information Systems (TOIS); Oct. 1999; vol. 17; Issue: 4.

Wu et al.—Towards a Highly-Scalable and Effective Metasearch Engine; Proceedings of the 10th international conference on World Wide Web; Mar. 2001.

Gelbukh et al.—Combining Sources of EVIDENCE for Recognition of Relevant Passages in Texts; Advanced Distributed Systems; vol. 3563 of the series Lecture Notes in Computer Science; pp. 283-290 (2005).

Liu et al.—An Extractive Text Summarizer Based on Significant Words; Computer Processing of Oriental Languages. Language Technology for the Knowledge-based Economy; vol. 5459 of the series Lecture Notes in Computer Science; pp. 168-178 (2009) (abstract only).

Gupta et al.—Document Summarization Based on Sentence Ranking Using Vector Space Model; International Journal of Data Mining, Modelling and Management; vol. 5; Issue: 4; DOI: 10.1504/IJDMMM.2013.057680 (2013).

Jayabharathy et al.—Multi-Document Summarization Based on Sentence Features and Frequent Item Sets; Advances in Computer Science, Engineering & Applications; vol. 166 of the series Advances in Intelligent and Soft Computing; pp. 657-671 (2012) (abstract only).

Getting Inspired by Unusual Relevant Sources; TRIZ & Patent Inspiration: New Insights, Inspiration and Ideas; Gijs Bakker & Gertjan, Otto Jun. 22, 2016.

Patent Inspiration, Jun. 15, 2018.

Resolute Innovation, Connect Your Company With Emerging Technology, Feb. 25, 2017.

Resolute Innovation, Predict Every Future Product and Threat Long Before Its Commercialization With Cutting-Edge Artifical Intelligence; Dec. 22, 2017.

Citrine IO Overview, TomKat Center For Sustainable Energy, Stanford University, Citrine Informatics, (date unknown).

Citrine IO Overview, Feb. 2017, AI-Powered Materials Informatics Accelerating the Global 1000, Citrine Selected Into the 2017 A1100 by CBInsights; Jan. 11, 2017.

Resolute Innovation Oct. 2017, Connect Your Company With Emerging Technology; Jun. 20, 2015.

Citrine IO Feb. 2018, Data is the Future of Materials; Sep. 18, 2013.

Shaping Tomorrows Breakthrough Materials; Stanford Graduate School of Business, Jun. 22, 2015.

Patent Inspiration Components, Accessed Between Apr. 27 and May 3, 2018.

Patent Inspiration Problems, Accessed Between Apr. 27 and May 3, 2018.

Kasey's Blog, "Using Data Science to Drive Innoviation," available at http://newrycorp.com/blog/data-science-to-drive-innovation, from Mar. 8, 2017.

Citrine lends support to US government's Materials Data Challenge, Citrine Informatics, Jul. 7, 2015.

Flowerdew, L. (2008). Corpus-based analyses of the problem-solution pattern: A phraseological approach (vol. 29). Amsterdam: John Benjamins Publishing.

Scott, M. (2001). Mapping key words to problem and solution. In Patterns of text: In honour of Michael Hoey Benjamins, Amsterdam (pp. 109-127).

Charles, M. (2011). Adverbials of result: Phraseology and functions in the problem-solution pattern. Journal of English for Academic Purposes, 10(1), 47-60.

Medlock, B., & Briscoe, T. (2007). Weakly supervised learning for hedge classification in scientific literature. ACL, Citeseer, 2007, 992-999.

Mohamad ali, Afida. (2007). Semantic fields of problem in business English: Malaysian and British journalistic business texts. Corpora. 2. 211-239.10.3366/cor 2007.2 2.211.

Notice of Allowance dated Mar. 11, 2022 for related U.S. Appl. No. 15/953,606, filed Apr. 16, 2018.

* cited by examiner

BACKGROUND OF THE INVENTION

...

[0004] The stiffness of the SUSPENSION plays a role in HANDPIECE "feel" during cutting, audible noise, and bearing life. Currently, the SUSPENSION RINGS in known HANDPIECES are made of various grades of Viton or Kel-F rubbers, and these materials degrade after 300-800 sterilization cycles. It is believed that this degradation is a key determinant of HANDPIECE life (before BEARING replacement is required). Degradation can take various forms, including:
(1) compression set, such that the suspension no longer provides the design BEARING pre-load, which increases noise and leads to BEARING failure; (2) changes in stiffness, which alters the dynamic response and "feel" of the HANDPIECE during cutting; and, (3) catastrophic failure of the ELASTOMER, leading rapidly to BEARING failure. Such degradation is often exacerbated by repeated use and repeated exposure to conventional sterilization practices, which will often include exposure to high temperatures and pressures.

[0005] A need exists for elastomeric HANDPIECE COMPONENTS that will withstand repeated sterilizations with increased resistance to such degradation. It has been found that COMPONENTS such as SUSPENSION RINGS, SEALS and VALVES made of perfluoroelastomers, such as Chemraz available from Green-Tweed, show demonstrably less of each degradation phenomena after repeated sterilization and therefore, results in longer usable life of the HANDPIECE.

...

SUMMARY OF THE INVENTION

[0008] It is therefore, an object of the present invention to provide an improved dental HANDPIECE.

[0009] It is another object of the invention to provide an improved dental HANDPIECE which is improved in regard to its ability to withstand repeated sterilization cycles.

Fig. 4

Basic Search User Interface

Enter Search Terms:

[User-entered search terms, such as technical terms; optional Boolean operators]

☐ Include All Generic Problem Terms

Search

Fig. 5A

Basic Results Display

| Search Statistics | Problem Kernel 1 (displayed with user-selected display parameters) | Search Terms |
|---|---|---|
| • Stat 1 • Stat 2 • Stat 3 • Stat 4 | Problem Kernel 2 (displayed with user-selected display parameters) | • Term 1 • Term 2 • Term 3 • Term 4 |
| | Problem Kernel 3 (displayed with user-selected display parameters) | |
| | ... | |
| | Problem Kernel n (displayed with user-selected display parameters) | |

Fig. 5B

Search Statistics

| Assignees in search | Countries in search | Industries in search | Products in search | Other statistics of search |

- Stat 1
- Stat 2
- Stat 3
- Stat 4

Fig. 5C

Advanced Search User Interface

Enter Technical Search Terms:

[User-entered technical search terms; optional Boolean operators]

Enter Search-Specific Problem Terms:

[User-entered technical search terms; optional Boolean operators]

☐ Include All Generic Problem Terms

Select Generic Problem Terms

Additional Filter Criteria:

| Start Date ▼ | End Date ▼ | Companies ▼ | Countries ▼ |
|---|---|---|---|
| Problem ▼ | Products ▼ | Industries ▼ | Other ▼ |

Sort by:

| 1st | Valuation | ▼ | Select Valuation Algorithm(s) ▼ |
|---|---|---|---|
| 2nd | Intensity | ▼ | Select Intensity Algorithm(s) ▼ |
| 3rd | | ▼ | Select Algorithm(s) ▼ |
| 4th | | ▼ | Select Algorithm(s) ▼ |
| 5th | | ▼ | Select Algorithm(s) ▼ |

Search

Fig. 5D

SYSTEMS AND METHODS FOR AUTOMATICALLY IDENTIFYING UNMET TECHNICAL NEEDS AND/OR TECHNICAL PROBLEMS

CROSS-REFERENCE TO RELATED APPLICATIONS

This application claims priority to, and the benefit of, U.S. Provisional Patent Application Ser. No. 62/338,785, entitled "SYSTEMS AND METHODS FOR AUTOMATICALLY IDENTIFYING UNMET TECHNICAL NEEDS AND/OR TECHNICAL PROBLEMS" and filed May 19, 2016, the entire contents of which are incorporated herein by reference, to the extent that they are not conflicting with the present application. This application is related to U.S. Provisional Patent Application Ser. No. 62/485,589, entitled "SYSTEMS AND METHODS FOR AUTOMATICALLY IDENTIFYING UNMET TECHNICAL NEEDS AND/OR TECHNICAL PROBLEMS" and filed Apr. 14, 2017, the entire contents of which are incorporated herein by reference, to the extent that they are not conflicting with the present application.

BACKGROUND

The present disclosure generally relates to the field of computer databases and searching of computer databases. Exemplary systems and methods automatically identify unmet technical needs and/or technical problems in specific areas of technology. Other exemplary systems and methods automatically identify unmet technical needs and/or technical problems across numerous areas of technology.

Some businesses thrive by being able to identify unmet customer needs and meet those needs. A promising technology might languish because a quintessential application for that technology has never been identified and/or matched to the promising technology. Identifying an application for that promising technology potentially makes that technology very valuable. As another example, some previously successful technologies can find new application (and perhaps profitable application) if a previously unmet need is identified and matched to that technology. Top innovators can bridge the gap between a "technology push" and a "market pull" by intentionally searching for and identifying unmet customer needs in a specific technical area and matching available technologies with the unmet needs.

The task of identifying unmet customer needs in a specific technical area can be daunting, often seeming like searching for a needle in a haystack of documents, web pages, rumors, etc. Thus, this patent application provides technology that overcomes a problem specifically arising in the realm of computer networks: the shear multitude of documents and volume of text on the Internet and third-party document portals makes ordinary searches frustrating at best and completely useless at worst.

In short, Applicants have appreciated that there is a need for advanced computer intelligence in searching documents to identify unmet technical needs and/or technical problems.

SUMMARY

Systems and methods are provided for automatically identifying and displaying unmet technical needs and/or technical problems, such as identifying and displaying serious technical issues in specific areas of technology. In some exemplary embodiments, the text of technical documents is automatically analyzed to determine whether the text of any document identifies or potentially identifies a technical problem. In exemplary embodiments, portions of a documents called "problem kernels" and their associated features are automatically identified, automatically scored, and automatically ranked, and a subset of the problem kernels and/or features of problem kernels are displayed to a user on a computer display.

BRIEF DESCRIPTION OF DRAWINGS

FIG. 4 shows an exemplary display according to the present invention.

FIGS. 5A-5D show exemplary user interfaces according to the present invention.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

Figure 1:
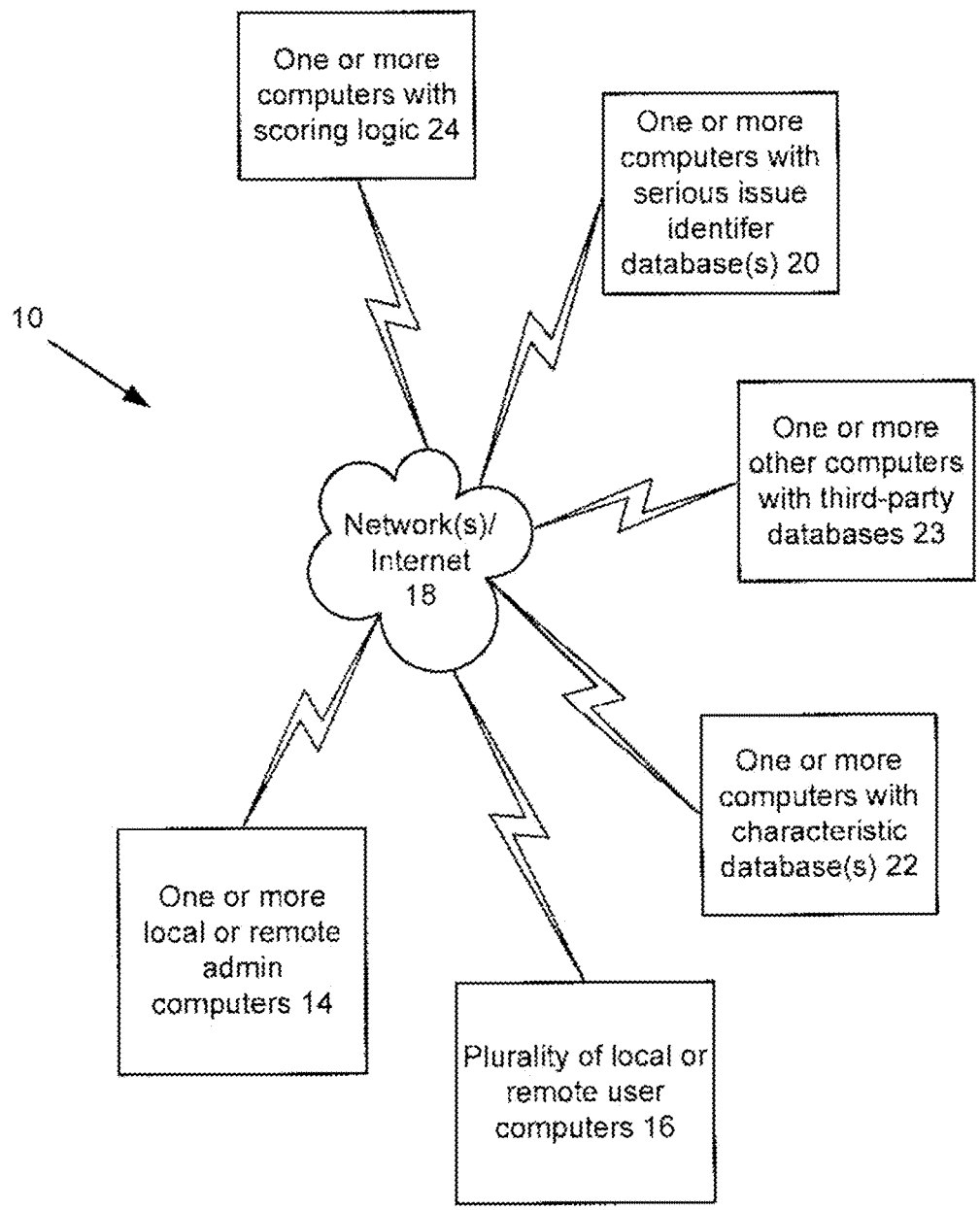
FIG. 1 is a schematic block diagram of an exemplary system.

Referring now to FIG. 1, a block diagram of an exemplary system 10 is shown. Exemplary system 10 provides users with an interface for identifying unmet technical needs and/or technical problems. System 10 includes one or more local or remote admin computers 14 in communication with a plurality of local or remote user computers 16, via one or more wired or wireless communication networks 18, e.g., the Internet. The user computers 16 are also in communication with one or more computers with one or more serious issue identifier databases 20, one or more computers with characteristic databases 22, and one or more computers with scoring logic 24, and perhaps one or more third party databases 23. The scoring logic 24 analyzes documents to identify unmet technical needs and/or technical problems, as discussed herein. For example, in exemplary embodiments, a plurality of technical documents are analyzed and each is scored based on the number of serious issue words and the number of characteristic words in that document or each subset of the document (the term subset of a document as used herein means a contiguous portion of less than the whole document, such as the paragraph, a sentence, or a phrase) or a number of sequential subsets of the document (and perhaps their proximity). In some exemplary embodiments, documents or document subsets or associated features of those documents/document subsets with the highest score are then displayed on a user computer 16. "Computer" or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc.

The computers 14, 16, 20, 22, 24 have logic for performing the various functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like.

In some exemplary embodiments, the computers 14, 20, 22, 24 are all implemented on a single computer (and accessed by separate remote user computers 16). In some embodiments, the computers 14, 16, 20, 22, 24 are all implemented on a single computer. Any one or any two or more of the computers 14, 16, 20, 22, 24 can be implemented on the same computer. All of the computers 14, 16, 20, 22, 24 can be implemented on one or more separate computers.

In some embodiments, the software used by the computers 14, 16, 20, 22, 24 to perform the various functions and processes herein is stored on one or more data storage devices local to those computers. As used herein, "data storage device" (synonymous with "memory") means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc. In some embodiments, computers 14, 16, 20, 22, 24 communicate with each other via network 18 utilizing, for example, a web browser or other client software stored in memory accessible by the computers 14, 16, 20, 22, 24. For example, in some exemplary embodiments, admin computers 14 include client software specifically utilized for communication with computers 20, 22, 24. Likewise, in some exemplary embodiments, user computers 16 have access to software that may be utilized to communicate with computers 20, 22, 24 via network 18.

Identifying Unmet Technical Needs and/or Technical Problems

In some exemplary embodiments, the various systems and methods identify unmet technical needs and/or technical problems using textual analysis of documents. In some exemplary embodiments, the system and/or the method scores documents suspected of identifying a technical problem ("candidate documents") and creates a computer display displaying various text meeting various threshold criteria. In some exemplary embodiments, individual documents with unmet technical needs and/or technical problems are identified with a specific technical area in mind, e.g., polymers or elastomers, and individual documents are analyzed and perhaps displayed in whole or in part on a computer display. In some exemplary embodiments, a custom summary of the kernel is displayed, such as a display including any one or any two or more of the following: topics/named entities descriptors exemplifying the text meeting the criteria, statistics of sentiment/"problem intensity", a computer generated summary of the problem, and/or statistics related to the problem across the corpus (e.g., frequency, trend/growth, etc.). In other exemplary embodiments, this is done more broadly, the identified unmet technical needs and/or technical problems are aggregated/normalized and analyzed in the aggregate, such as for problem intensity or dollar value of the aggregated identified unmet technical need or technical problem, and the aggregated/normalized unmet technical needs and/or technical problems are ranked vis-à-vis each other based on the aggregate analyses and perhaps displayed in whole or in part on a computer display. In other exemplary embodiments, both are done: individual documents with unmet technical needs and/or technical problems are identified with a specific technical area in mind, e.g., polymers or elastomers, and then other documents listing substantially the same unmet technical need and/or technical problem are identified, aggregated/normalized and analyzed in the aggregate, such as for problem intensity or dollar value of the aggregated identified unmet technical need or technical problem, and the individual unmet technical needs and/or technical problems are ranked vis-à-vis each other based on the aggregate analyses and perhaps displayed in whole or in part on a computer display.

In some exemplary embodiments, the one or more serious issue identifier databases 20 include a stored list of serious issue words, i.e., a stored list of words indicating a serious issue or problem with something, e.g., degrad\*, fail\*, catastroph\*, need\*, weak\*, insufficien\*, etc. (the \* indicates any form of the word, e.g., fail, failed, fails, failure, etc.). In some exemplary embodiments, a subset of the serious issue words are flagged as being more serious than others, e.g., flagged as red flag words, such as catastroph\*, fatal\*, death\*, etc. Such red flag words can be used by scoring logic to rank problem kernels or documents with such words higher priority (more likely the user will see them). In other exemplary embodiments, some or all of the serious issue words are given a seriousness value, i.e., a value indicating the seriousness of the problem indicated by the word. In such a taxonomy, red flag words would have one seriousness value, another subset of words (e.g., fail*, need*, degrad*, etc.) has a different, lower seriousness value, and other words (e.g., weak*, insufficien*, etc.) would have a third, still lower seriousness value, all of which could be used by scoring logic to assign problem kernels or documents higher or lower priority. In some exemplary embodiments, the serious issue words are generic across multiple technologies, like the foregoing list. In other embodiments, the serious issue words used are specific to a particular technology, indicating a serious technical issue in that area of technology, e.g., the terms flex fatigue, flexural deformation, creep, yield stress, stress whitening, etc. for a polymer technical area. In still other embodiments, the serious issue words used are a combination of a generic list of serious issue words and a list of words specific to a technology or technologies being analyzed. In some exemplary embodiments, a computer user interface is provided with which a user will select one or a plurality of sets of serious issue words, e.g., generic serious issue words, polymer serious issue words, glass serious issue words, ceramic serious issue words, etc.

Some exemplary embodiments use the serious issue identifier database in a lexicon-based approach, determining the presence of a serious issue word and its likely dependence/proximity to the other words/entities in the document. In other exemplary embodiments, a machine-learning-based (ML-based) sentiment analysis model, which has been trained on the various input documents in the database (or more generalized sentiment analysis model), is used. ML sentiment analysis techniques can include a variety of approaches, such as Naïve Bayes, Neural Networks, etc. Such techniques would leverage a wide variety of text features, potentially including term frequency, part-of-speech tags, negations, etc. This can be done at a document, paragraph, sentence, phrase/n-gram, or individual word/entity/"aspect" level to identify negative sentiment at that level. In these other embodiments, the one or more serious issue identifier databases 20 are provided as part of a specifically trained or more generalized sentiment analysis engine (e.g., the portion of the generalized sentiment analysis engine indicating a negative sentiment or a highly negative sentiment). In still other exemplary embodiments, a hybrid approach is used, using both a lexicon-based approach and a sentiment analysis approach, e.g., doing initial filtering or initial scoring of documents with sentiment analysis and then using serious issue words or red flag words to identify potential problem kernels for display or augment document scores indicating the presence of potential problem kernels.

In some exemplary embodiments, one or more other analyses are done before scoring. For example, in some exemplary embodiments, problem "scalars" or associated quantitative metrics detailing the deficiency of certain characteristics are identified. In some exemplary embodiments, this is done using an ML-based approach, such as named entity recognition, based on similar approaches (some discussed above), for identifying numbers/"ordinals" in the text.

In exemplary embodiments, scoring logic 24 performs a textual analysis of source documents or a filtered subset of source documents to determine which of the serious issue words are in that document/subset/paragraph/sentence/etc. (e.g., which serious issue words, number of serious issue words, proximity to each other, etc.) as part of scoring each document/subset/paragraph/sentence/etc. as candidates for identifying unmet technical needs and/or technical problems (i.e., scoring to indicate the presence of a problem kernel in that document/subset/paragraph/sentence/etc.). The words in the serious issue identifier database 20 are manually entered in some exemplary embodiments. In addition, or in the alternative, in exemplary embodiments, one or more of the computers leverage knowledge-based approaches such as including logic to access existing publicly available or paid lexical knowledge databases, such as IBM Watson, Freebase, DBPedia, Yago, etc. to identify generic or technology-specific serious issue words. In addition, or in the alternative, one or more of the computers can have logic to automatically identify serious issue words within documents based on context utilizing machine learning techniques. For example, without limitation, any one or any two or more of the following named entity recognition and word tagging algorithms can be used by the computers (i.e., they have code to cause a processor) to automatically identify and classify serious issue words in documents: Maximum Entropy Classifier, Naive Bayes, Neural Networks/Deep Learning Architectures, other linear classifiers etc. Exemplary systems use the linear classifier algorithms to automatically identify serious issue words as follows: creating a training data set with a combination of identified serious issue words and non-serious issue words and a series of variables or "features" related to each word as used in a particular context, which will be treated as explanatory/independent variables, such as distance from a "qualifier word" (e.g., improved, reduced, etc. described below), a number, etc., and create a statistical model, such as a logistic regression, to predict the probability that a newly-processed word, based on its variables, is a serious issue word or some other entity. Broadly speaking, in some exemplary embodiments, when the scoring logic 24 is using serious issue words and/or red flag words for scoring, it is performing sentiment analysis of the documents/subsets/paragraphs/sentences/etc., searching for negative sentiment and the score for each document/subset/paragraph/sentence/etc. is a reflection of the degree of negative sentiment therein.

In some exemplary embodiments, the one or more characteristic databases 22 include a stored list of characteristic words indicating a generic characteristic of something, e.g., stiffness, lifetime, usable life, temperature resistance, tensile strength, alter*, repeat*, increas*, decreas*, resist*, withstand, longer, shorter, etc. (again, the * indicates any form of the word, e.g., alter, alters, altered, altering, etc.). In some exemplary embodiments, the characteristic words can be just about any characteristic. In some other exemplary embodiments, the characteristic words are limited to specific attributes, such as temperature resistance, lifetime, length, etc., i.e., metrics, without an indication of whether higher or lower is better. In embodiments where the characteristic words are more limited, some exemplary embodiments include one or more other databases, such as a qualifier word database with qualifier words (or simply a qualifiers database with qualifiers), e.g., "higher", "lower", "minim*", "maxim*", "reduc*", etc. Qualifiers would also include numbers, which wouldn't necessarily be in the qualifiers database but could be searched for proximate one or more qualifiers. As examples, the word "length" would be a characteristic word and "longer" would be a qualifier word. In such exemplary embodiments, it is helpful to separate characteristic words from qualifier words so they can be treated separately, e.g., searched separately, used to rank problem kernels or documents separately, etc.

The words in the characteristic database 22 are manually entered in some exemplary embodiments. In addition, or in the alternative, in some exemplary embodiments one or more of the computers can leverage knowledge-based approaches such as including logic to access existing publicly available or paid lexical knowledge databases, such as Freebase, DBPedia, Yago, etc. to identify characteristic words. In addition, or in the alternative, in exemplary embodiments one or more of the computers can have logic to automatically identify characteristic words within documents based on context utilizing machine learning techniques. For example, without limitation, any one or any two or more of the following named entity recognition and word tagging algorithms can be used by the computers (i.e., they have code to cause a processor) to automatically identify characteristic words in documents: Maximum Entropy Classifier, Naive Bayes, Neural Networks/Deep Learning Architectures, and other linear classifiers, etc. Exemplary systems use the classification algorithms to automatically identify characteristic words as follows: creating a training data set with a combination of identified characteristic words and non-characteristic words and a series of variables or "features" related to each word as used in a particular context, which will be treated as explanatory/independent variables, such as distance from a "qualifier word" (e.g., improved, reduced, etc. described below), a number, etc., and create a statistical model, such as a logistic regression model, to predict the probability that a newly-processed word, based on its variables, is a characteristic word or some other entity.

In exemplary embodiments, scoring logic 24 performs a textual analysis of candidate documents to determine which of the serious issue words and characteristic words are in that document or a subset of that document (e.g., which characteristic words, number of characteristic words, proximity to each other, proximity to serious issue words, etc.) as part of scoring each document as candidates for identifying unmet technical needs and/or technical problems. In some exemplary embodiments, scoring logic 24 includes (a) automatically identifying at least one subset of each document (called a "problem kernel" herein) that expresses a technical problem or an unmet technical need and (b) scoring each problem kernel based on at least serious issue words and characteristic words in that problem kernel and/or in other parts of the document (and/or based on data external to the document). In some exemplary embodiments, problem kernels consist of a single paragraph from each document. An exemplary problem kernel consisting of a paragraph is shown in paragraph [0004] of US patent application publication US2007/0238067A1, which is shown in annotated form in FIG. 4. This will be referred to as "Problem Kernel 1" herein. In other exemplary embodiments, other subset sizes are used as problem kernels, e.g., one or more sentences or phrases. An exemplary problem kernel less than a full paragraph is found in a subset of paragraph [0042] of US patent application publication US2011/0293404A1:

This potential pressure differential is problematic since it may induce leakage of lubricant out of the turbine into the surrounding water or, alternatively, seepage of water into the sealed-off chambers of the turbine. In the former case, leakage of lubricating oil into the water is potentially bad for the environment, although for this particular turbine, care has been taken to utilize an oil that is biodegradable and environmentally-friendly. Another problem with leakage of oil is that, overtime, the turbine will lose lubricant quantity and pressure, thus eventually degrading performance. Seepage of water into the sealed-off chambers of the turbine is also highly problematic as this dilutes the lubricant, changing its composition and efficacy. Therefore, it is highly desirable to minimize, if not outright eliminate, any pressure differentials between the inside chambers of the turbine and the ambient water.

This will be referred to as "Problem Kernel 2" herein. As with Problem Kernel 1, Problem Kernel 2 has several problem expressions less than a full sentence therein, e.g., "Seepage of water into the sealed-off chambers of the turbine is also highly problematic," "potential pressure differential is problematic," "leakage of lubricating oil into the water is potentially bad for the environment," etc. Other examples of problem kernels include: U.S. Pat. No. 8,534,893 col. 1, lines 22-39; paragraph [0014] of U.S. Pat. Pub. No. US2011/0169934 A1; and paragraph [0003] of U.S. Pat. Pub. No. US2006/0114683 (all of which sections are incorporated by reference in their entireties). These are the types of problem kernels automatically identified by the various systems and methods herein.

In some exemplary embodiments, ML techniques are used to score documents based on a training set, as well, leveraging same techniques (e.g., neural nets/deep learning approaches) to identify and score probabilities of documents based on presence of problem kernels. In some exemplary embodiments, the magnitude of consequences and/or magnitude of the deficiency in scoring are identified. This can guide the sentiment analysis scoring or help extract the quantified ranges at which problems occur. In some exemplary embodiments, "scalars" or "ordinals" of the problem are determined or calculated prior to scoring. In some exemplary embodiments, scoring is a combination of scores from sentiment analysis, analysis of serious issue words, and the magnitude of scalar/ordinals. In some exemplary embodiments, document-level classifications are added to other databases, referring for instance to industries/markets or other verticals.

Figure 2:
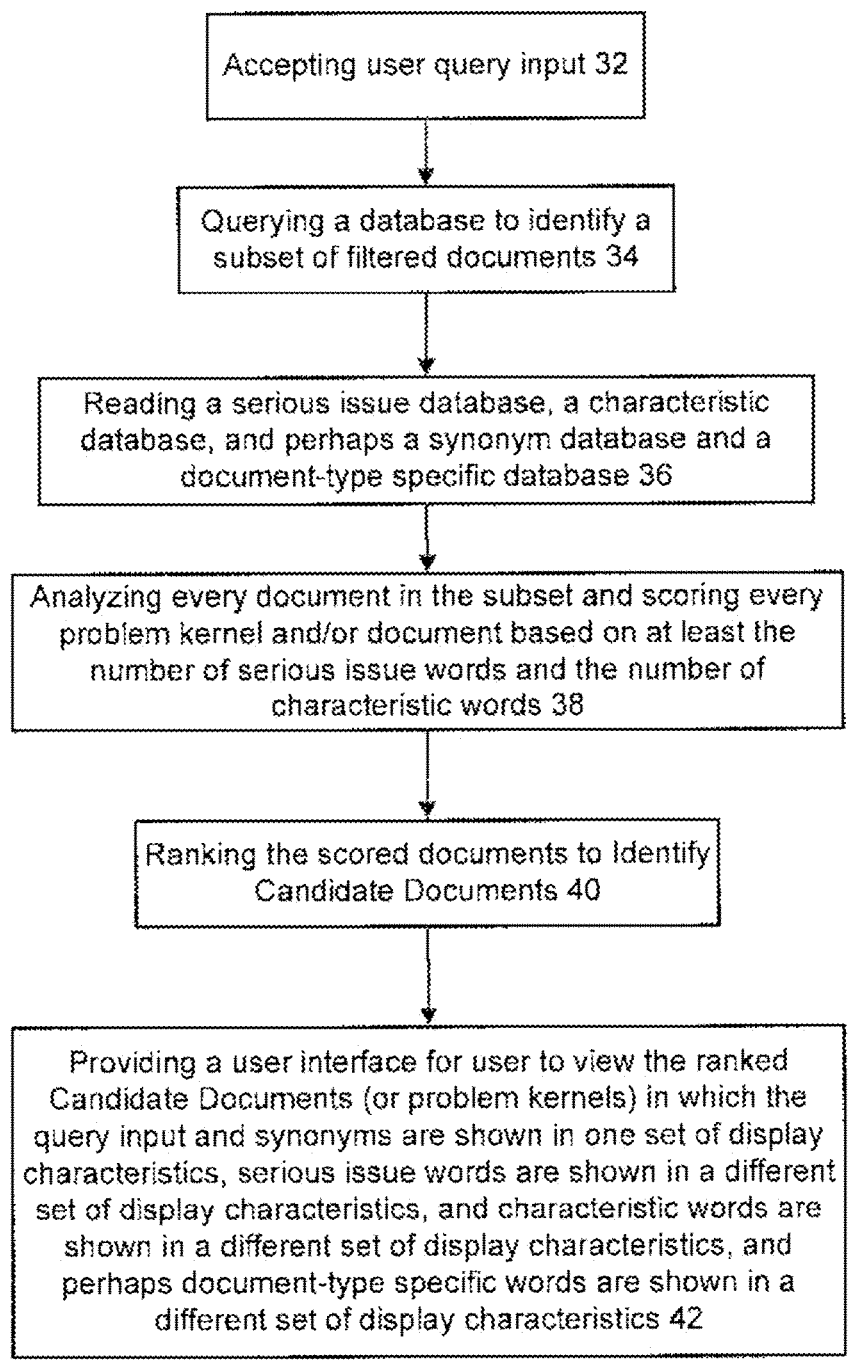
FIG. 2 is a schematic flow diagram of an exemplary method.

Referring now to FIG. 2, a flowchart of an exemplary method 30 is shown. An exemplary computer implemented method of generating an image on an electronic display comprises accepting a user query input, at 32. In some embodiments, a computer-generated user interface is provided with a field into which user types words used to limit the search (e.g., by filtering documents from a source database into a subset of filtered documents), such as one or more of a technical area (e.g., "dental hand piece" or "polymer"), a company name, a date range, an industry, an author or inventor, etc.

Figure 8:
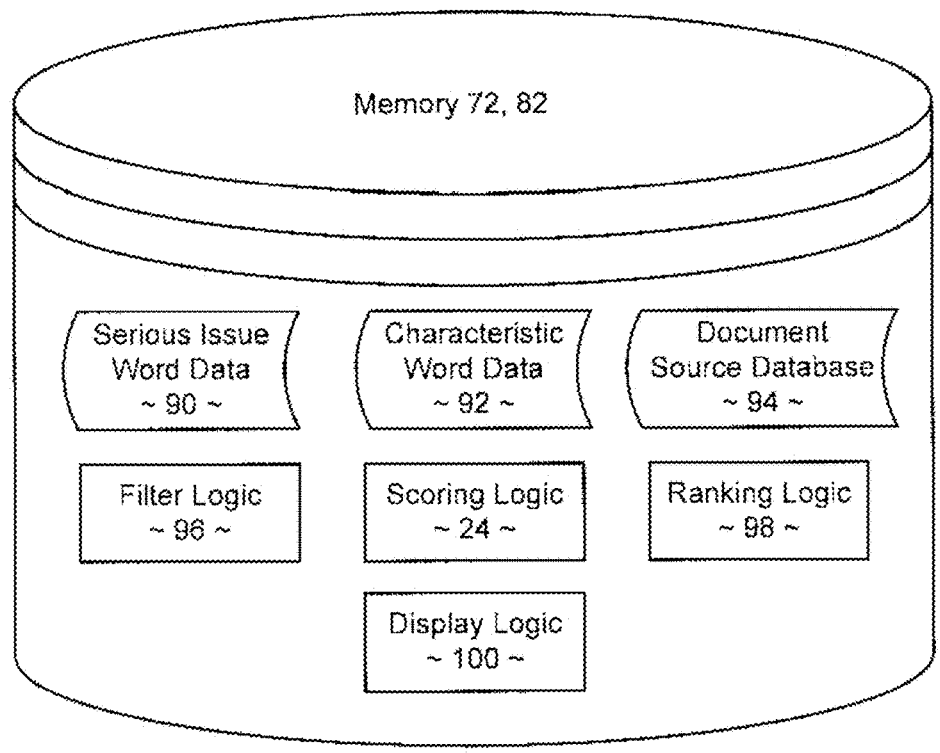
FIG. 8 is a schematic diagram of exemplary data storage devices herein.

In exemplary embodiments, there is a source document database (94 in FIG. 8). The exemplary method of FIG. 2 also includes querying the source document database to identify a subset of filtered documents (not shown) that meet the user query input, at 34. The document database 94 can be a third party document database 23, such as the U.S. Patent Office database or IFI Claims, Elsevier, EBSCO, PubMed, DOE.gov, SBIR/STTR, SEC.gov, NIH/NSF, etc., or a database on one or more of the computers 14, 16, 20, 22, 24. This step 34 is essentially a filtering step using filter logic (96 in FIG. 8) to reduce the universe of documents and in exemplary embodiments includes searching for documents that include user query words and optionally also searching for documents that include synonyms of user query words from a synonym database. An output of this step is at least a list of subset (filtered) documents that meet the query language, e.g., include all of the user query words (and perhaps synonyms of user query words) and meet any other query parameters, such as filed restrictions and Boolean operators. The filtering step 34 is optional but particularly important when a system has limited processing power or access to the source document database 94 and the source document database 94 includes documents pertinent to numerous different technologies. For example, a system might not have unfettered access to the full text of the entire database of US patents or relevant scientific journals; accordingly, it might be beneficial to use a filter step 34 to limit the size of the database to something more pertinent to the search and/or limit the sheer size of the universe of documents being analyzed, scored, ranked, and displayed. In some exemplary embodiments, the full text of the filtered subset is downloaded to one of the computers 14, 16, 20, 22, 24 to facilitate analysis, scoring, and ranking thereof.

The exemplary method of FIG. 2 also includes, at 36, reading from the serious issue identifier database 20 the words indicating a serious issue or problem. These can include a list of generic serious issue words, a list of serious issue words specific to a selected technical area (e.g., selected by a user using a user interface, such as check boxes or radio buttons or input by the user from the UI), or a combination of generic serious issue words and serious issue words specific to a selected technical area.

Step 36 also includes reading from the characteristic database 22 words indicating a generic characteristic of something. Exemplary characteristic words are discussed above. Serious issue words indicate an issue or problem; characteristic words are not so limited.

Next, the documents/subsets/paragraphs/sentences/etc. are scored. The exemplary method of FIG. 2 also includes at 38 automatically with a computer analyzing and scoring all of the filtered documents/subsets/paragraphs/sentences/etc. (or a selected subset thereof) based on the number of serious issue words and the number of characteristic words (and perhaps their proximity). In some exemplary embodiments, the scoring is done by scoring every paragraph or other document subset based on the number of serious issue words and the number of characteristic words (and perhaps their proximity). In other exemplary embodiments, the scoring is done by scoring every pair of (or three or four or more) sequential paragraphs or other sequential subsets based on the number of serious issue words and the number of characteristic words (and perhaps their proximity). In some exemplary embodiments, red flag words are used by the scoring logic to rank problem kernels or documents with such words higher priority (more likely the user will see them). In other exemplary embodiments, the seriousness value of serious issue words are used by scoring logic to assign problem kernels or documents higher or lower priority. In some exemplary embodiments, scoring is based on a measure of sentiment of different problems in the document, or sentiment associated with named entities of the most interest. In some exemplary embodiments, scoring is based on "problem intensity," which includes a compound of problem likelihood and trend/size of the problem. In some exemplary embodiments, scoring is based on any two or more of the scoring methodologies discussed herein. In some exemplary embodiments, scoring is based on relevance based on user query input or a subset thereof. In all these embodiments, scoring is done by scoring logic 24 having computer code causing a processor of one of the computers 14, 16, 20, 22, 23, 24 to analyze and score the documents or subset of documents. Although the filtering step 34 is shown as a separate step, it need not be done as a separate step before scoring and ranking are done. If a computer system has sufficient computing power and access to a source document database 96, the filtering step can be done at the same time as the analyzing/scoring step 38, e.g., in some exemplary embodiments, as documents that meet the query are identified, they are immediately scored and ranked. In some exemplary embodiments, the scoring is done in two phases: (a) automatically identifying at least one problem kernel in each document and (b) scoring each problem kernel based on at least serious issue words and characteristic words in that problem kernel and/or in other parts of the document (and/or based on data external to the document, as discussed herein). Automatically identifying problem kernels in each document facilitates display of individual unmet technical needs and/or technical problems to a user, i.e., in exemplary systems, the problem kernels are displayed to a user analyzing individual documents or individual unmet technical needs and/or technical problems.

Next, at 40, the scored documents/subsets/paragraphs/sentences/etc. are ranked (to identify candidate documents) based on their score vis-à-vis the score of other documents/subsets/paragraphs/sentences/etc. As mentioned above, if there is sufficient processing power, steps 38 and 40 can be compressed into a single step in some embodiments. In some exemplary embodiments, the ranking of the documents is done based on their highest-scored paragraph or subset or highest-scored pair of sequential paragraphs or sequential subsets. In some exemplary embodiments, the ranking of the documents is done based on their highest-scored problem kernel. In some exemplary embodiments, a user interface provides a user with options for ranking the documents and/or problem kernels, e.g., radio buttons for one of highest document score, highest-scored paragraph, or highest-scored pair of sequential paragraphs. In all these embodiments, ranking is done by ranking logic (98 in FIG. 8) having computer code causing a processor of one of the computers 14, 16, 20, 22, 23, 24 to rank the documents or subset of documents based on ranking criteria input by the user.

Next, a user interface is provided for users using computers 16 to view the ranked candidate documents/subsets/paragraphs/sentences/etc. or problem kernels, at 42. In some exemplary embodiments, the scored candidate documents are ranked highest-ranked documents or problem kernels first. In some exemplary embodiments, the text of individual documents/subsets/paragraphs/sentences/etc. or problem kernels is displayed with the various types of words described herein being displayed with display characteristics that set them apart from other words, e.g., query words, serious issue words, and characteristic words all being displayed differently from other words. In some exemplary embodiments, the text of individual documents or problem kernels is displayed with the different types of words being displayed with each type of word being displayed differently from other types of words and from other words. Thus, in some embodiments, query input words are shown in one set of display characteristics (such as bolded black display text), serious issue words are shown in a different set of display characteristics (such as bold/underline red display text), and characteristic words are shown in a different set of display characteristics (such as bolded blue display text). An example of this is shown in FIG. 4, which shows an exemplary problem kernel from US patent application publication number US2007/0238067A1, with ordinary text being shown in un-bolded and un-underlined black text, query input words being shown as bolded black display text, serious issue words being shown as bold/underline red display text, and characteristic words being shown as bolded blue display text. Optionally, in FIG. 4 nouns (or simply things, i.e., a subset of nouns excluding persons and places) are shown in bolded ALL CAPS and document-specific words are shown in bolded green text, as discussed below. As can be seen, a display like that of FIG. 4 allows one to quickly notice that this document identifies a technical issue or technical problem, i.e., the need for elastomeric hand piece components that will withstand repeated sterilizations with increased resistance to degradation. In some exemplary embodiments, a user interface provides a user with options for displaying the documents, e.g., radio buttons for each type of word, e.g., ordinary text, query-meeting text, serious issue words, characteristic words, nouns, synonyms, document specific words, etc. In all these embodiments, the display is generated by display logic (100 in FIG. 8) having computer code causing a processor of one of the computers 14, 16, 20, 22, 23, 24 to display the candidate documents based on display criteria input by the user.

In exemplary embodiments, the user interface will also provide means for a user to move from one ranked, scored document or problem kernel to the next, e.g., (a) computer code accepting left and right arrows on a keyboard or up and down arrows in a keyboard to move back and forth between ranked, scored documents or (b) computer code generating a graphical user interface that accepts inputs from a pointing device, such as a mouse or a finger on a fact sensitive input device, such as "previous" and "next" icons or (c) computer code implementing a voice-activated interface. In some exemplary embodiments, the user interface will also provide means for a user to flag a particular ranked, scored document or problem kernel to separate flagged documents from un-flagged documents, e.g., a keyboard key, or an icon, or a specific voice command (using the user interface computer code). In some exemplary embodiments, an interface is provided for a user to search named entities and/or document classifications.

FIGS. 5A-5D show exemplary user interfaces. FIG. 5A shows an exemplary basic search user interface containing a data field in which a user may enter query terms, such as technical terms, serious issue terms, etc., a check box with which a user may include all generic problem terms in the search (e.g., all serious issue words), and a Search icon with which a user executes a search and analysis with the terms entered in the data field. FIG. 5B shows an exemplary basic results display and user interface showing at least problem kernel displayed with user-selected display parameters and an icon (or other user selection user interface device). A user using this user interface can quickly move between ranked, scored documents or problem kernel displayed as described herein, such as with the characteristics of FIG. 4, moving from document to document (or from problem kernel to problem kernel) to separate wheat from chaff so to speak, i.e., identify and flag documents pertinent to the search or otherwise subject to further processing. The basic results display and user interface FIG. 5B also displays a dashboard of Search Statistics, e.g., list of top assignees, patent date range, list of top products or industries. Items in the search box could include links to additional interfaces or browser tabs and displays Search Terms, i.e., a key or legend of user-selected display parameters for the various types of words in the search, such as serious issue words, characteristic words, etc. FIG. 5C shows a Search Statistics display, which shows various tabs with more detailed statistics including tables and graphs of assignees, countries, problem kernels by year, products, and industries, etc. This would be used to provide additional information to the user to create more focused search queries.

FIG. 5D shows another exemplary search user interface containing:
  a. a data field in which a user may enter query terms, such as technical terms, serious issue terms, etc.,
  b. a data field in which a user may enter search-specific problem terms,
  c. a check box with which a user may include all generic problem terms in the search (e.g., all serious issue words and/or all characteristic words and/or all qualifiers)
  d. a Select Generic Problem Terms icon or other user interface object permitting a user to select in the search (or exclude from the search) specific generic problem terms;
  e. user interfaces, e.g., calendar objects or drop down selection objects, permitting a user to add additional filter criteria such as document start date, document and date, companies (e.g., assignee of a patent or patent application), country of publication, normalized problem (e.g., fluid leakage), specific products (e.g., hydroelectric turbines for hand tools), specific industries (e.g., by SIC code), or other filter criteria.
  f. user interfaces, e.g., drop down selection objects, permitting a user to add sort criteria to the analysis, e.g., automatic valuation (optionally using selected valuation methodologies and/or algorithms) and/or automatically determined problem intensity (optionally using selected problem intensity determination methodologies and/or algorithms, and
  g. a Search icon with which a user executes a search and analysis with the entered terms and the selected parameters.

Figure 3:
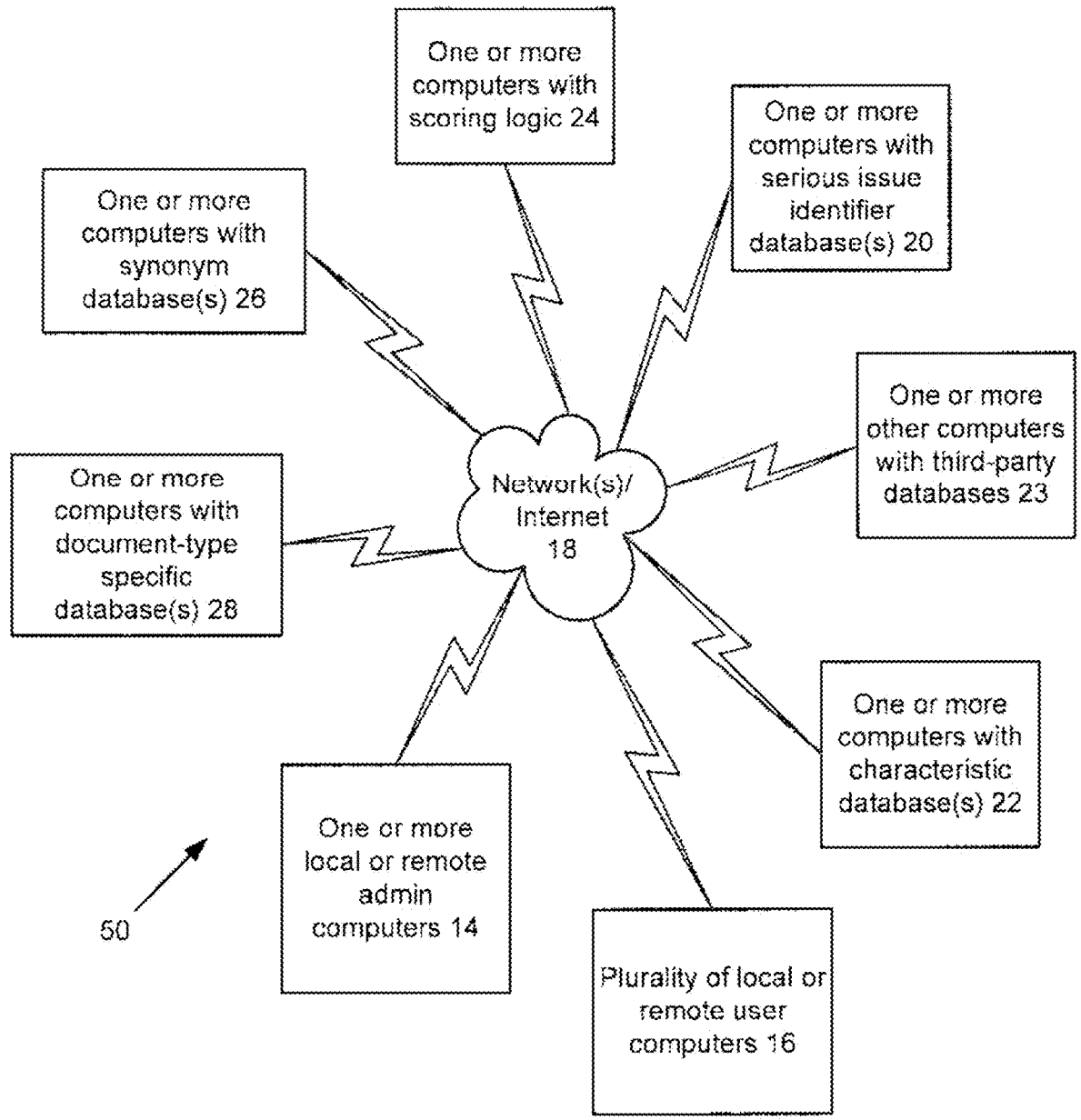
FIG. 3 is a schematic block diagram of another exemplary system.

Referring now to FIG. 3, another exemplary embodiment 50 includes (in addition to the system components shown in FIG. 1) one or more computers with synonym databases 26. Thus, in some exemplary embodiments, the query words, the serious issue words, and the characteristic words are expanded using one or more synonym databases containing lists of synonyms for words at some point in the process of FIG. 2, such as expanding query words (user query input) prior to determination of candidate documents (at 34) and/or expanding serious issue words and/or characteristic words prior to analyzing the candidate documents and scoring them (at 38).

In addition, or in the alternative, exemplary embodiment 50 of FIG. 3 includes (in addition to the system components shown in FIG. 1) one or more computers with document-type specific databases 28. The document-type specific databases 28 include lists of words particular to specific document types and helpful for the systems and methods described herein. For example, in exemplary embodiments analyzing United States patents, the following patents-specific words would be helpful: "object of the invention," "object of the present invention," "improved," "improvement," "need for," etc. In some exemplary embodiments, document-type specific words are used during the analysis and scoring process of step 38 of FIG. 2. That is, in exemplary embodiments, in step 38, all of the candidate documents (or a selected subset thereof) are analyzed and scored based on the number of serious issue words, the number of characteristic words, and the number of document-specific words (and perhaps their proximity). In some exemplary embodiments, the scoring is done by scoring every paragraph or other subset based on the number of serious issue words, the number of characteristic words, and the number of document-specific words (and perhaps their proximity). In other exemplary embodiments, the scoring is done by scoring every pair of (or three or four or more) sequential paragraphs or subsets based on the number of serious issue words, the number of characteristic words, and the number of document-specific words (and perhaps their proximity).

The user interface and step 42 of FIG. 2 are also modified in exemplary embodiments so that the document-specific words are displayed the same as the other types of words (different from other words) or document-specific words are displayed differently from the other types of words and different from other words. Thus, in some embodiments, query input words (and synonyms, if used) are shown in one set of display characteristics (such as bolded black display text), serious issue words are shown in a different set of display characteristics (such as bold/underline red display text), and characteristic words are shown in a different set of display characteristics (bolded blue display text), and document-type specific words are shown in a different set of display characteristics (bolded green display text). In the example of FIG. 4, ordinary text is shown in un-bolded and un-underlined black text, query input words are shown as bolded black display text, serious issue words are shown as bold/underline red display text, characteristic words are shown as bolded blue display text, and document-specific words are shown in bolded green text. Optionally, in FIG. 4 nouns are shown in bolded ALL CAPS. Obviously, other display characteristics can be used that will fall within the scope of this invention.

Figure 6:
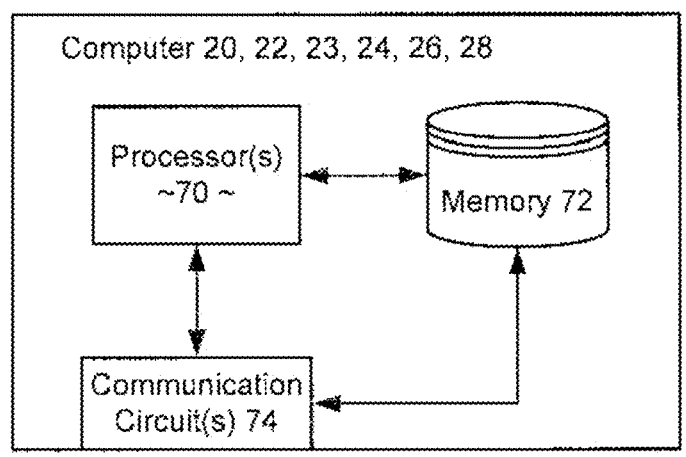
FIG. 6 is a schematic block diagram of exemplary computers herein.

Referring now to FIG. 6, exemplary computers 70, 72, 23, 74, 26, 28 are shown. The computers 70, 72, 23, 74, 26, 28 of FIG. 6 have one or more processors 70 in communication with a memory 72 and one or more communication circuits 74. Memory 72 includes one or more non-transitory computer readable media of one or more local or remote data storage devices. Data for the various computers 20, 22, 23, 24, 26, 28 and associated processes described herein can be stored on memory 72 permitting that data to be accessed by the remote user computers 16 over the networks 18 using the communication circuits 74. The software used by the computers 20, 22, 23, 24, 26, 28 to perform the various functions and processes herein can be stored on one or more data storage devices local to the computers 20, 22, 23, 24, 26, 28. computers 20, 22, 23, 24, 26, 28 can communicate with user computers 16 and admin computers 14 and each other and other computers via network 18 utilizing, for example, a web browser or other client software stored in memory accessible by the computers 14, 16. For example, in exemplary embodiments, computers 14, 16 include client software specifically utilized for communication with computers 20, 22, 23, 24, 26, 28.

Figure 7:
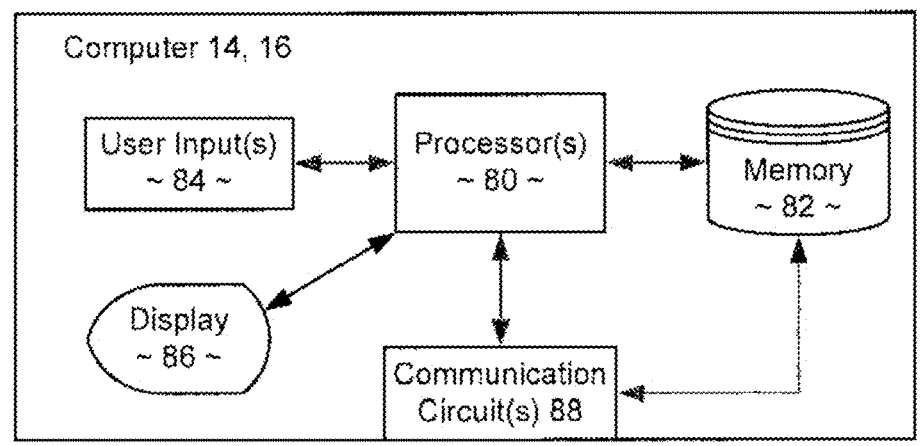
FIG. 7 is a schematic block diagram of other exemplary computers herein.

Referring now to FIG. 7, a block diagram of an exemplary computer 14, 16 is shown. Computers 14, 16 comprise one or more processors 80 in communication with a memory circuit 82, one or more user input circuits 84, a display circuit 86, and one or more communication circuits 88. Memory circuit 82 comprises one or more non-transitory computer readable media of one or more data storage devices. In the context of a handheld computer, this memory circuit might include flash memory and/or RAM and/or ROM memories. In the context of a desktop or laptop computer, this memory circuit might include one or more fixed disk drives and/or RAM and/or ROM memories. Memory circuit 82 will have stored thereon logic modules for performing the various functions and processes described herein or a program to access such logic modules from a remote memory, such as base memory 82 (e.g., a browser program to access such logic modules from memory 72 of computers 20, 22, 23, 24, 26, 28). In exemplary embodiments, user input circuits 84 include any one or more of buttons, keyboards, keys, touchpads, touchscreens, and associated support chips, and/or one or more communication circuits (e.g., RS-232 or USB) for an external keyboard or other external user input device, such as a mouse, track pad, or other pointing device, or other user input devices. In exemplary embodiments, display circuit 86 include any one or more of LEDs, N×M textual displays, matrix displays on which a graphical user interface ("GUI") can be presented, e.g., a color or monochrome liquid crystal display ("LCD") or organic light-emitting diode ("OLED") display, with associated drive chips, and/or one or more graphics circuits (e.g., VGA or HDMI) for an external display, or other displays. In exemplary embodiments, communication circuits 88 include antennas and/or data ports and driver chips for sending and receiving communications with devices external to the computer 14, 16. In exemplary embodiments, communication circuits 88 include any one or more of WiFi antennas and circuitry, LTE antennas and circuitry, GPS antennas and circuitry, CDPD antennas and circuitry, GPRS antennas and circuitry, GSM antennas and circuitry, UMTS antennas and circuitry, and other antennas and circuitry, USB ports and circuitry (e.g., standard, micro, mini, etc.), RS-232 ports and circuitry, proprietary ports and circuitry (e.g., APPLE 30 pin and Lightning ports), RFID antennas and circuitry, NFC antennas and circuitry, bump technology antennas and circuitry, a Bluetooth antenna and circuitry, and other antennas, ports, and circuitry.

Referring now to FIG. 8, an exemplary memory 72, 82 is shown. Memory 72, 82 includes one or more non-transitory computer readable media of one or more local or remote data storage devices of one or more of computers 14, 16, 20, 22, 23, 24 having stored thereon (or having a pointer thereto stored thereon) any one or more of the following types of data and logic: serious issue word data 90, e.g., a serious issue identifier database 20, characteristic words data 92, such as a characteristic database 22, a document source database 94, filter logic 96, scoring logic 24, ranking logic 98, and display logic 100, all discussed above. "Pointer" and "point to" as used herein in connection with data or software include, but are not limited to, storing on a non-transitory computer readable media of a data storage device one or more data indicating the location on another data storage device from where the data or software can be downloaded or otherwise accessed.

Figure 9:
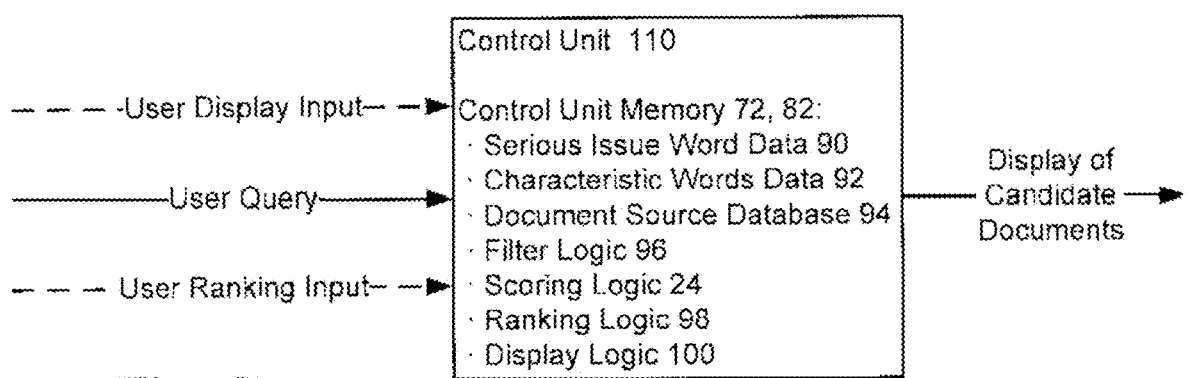
FIG. 9 is a schematic block diagram of an exemplary control unit for identifying and displaying candidate documents.

Referring now to FIG. 9, an exemplary control unit 110 is shown. The control unit 110 has one or more processors 70, 80 in communication with memory 72, 82 including one or more non-transitory computer readable media of one or more local or remote data storage devices comprising at least serious issue word data 90; characteristic words data 92; document source database 94; filter logic 96; scoring logic 24; ranking logic 98; display logic 100; discussed herein. The control unit 110 accepts at least user query input and outputs at least a display of ranked candidate documents. In some exemplary embodiments, the control unit 110 also accepts user ranking criteria and user display criteria, discussed above.

In some exemplary embodiments, a user seeking to identify individual unmet technical needs and/or technical problems performs the following (not necessarily at the same time; some of this could be done beforehand or later or by default; any subset of the steps would be used in some exemplary embodiments):

a. select one or more source document databases;
b. select a user display option, such as having the system automatically identify problem kernels, scored them, rank them, and display them using user-selected display parameters, e.g., KWIC with user-selected display parameters for serious issue words, characteristic words, and document-specific words;
c. enter user query words into a user interface to narrow the scope of the analysis;
d. actuate a user interface object, such as an icon, initiating the automatic filtering of the documents using the user query words and automatic analysis of the documents meeting the user query criteria to automatically identify problem kernels using serious issue words and characteristic words from their respective databases;
e. examine on a computer display one or more problem kernels displayed using the user-selected display parameters;
f. actuate a user interface object, such as an icon, flagging the presently displayed problem kernel or a selected problem kernel as pertinent to the search or otherwise subject to further processing in causing the system to display the next problem kernel display;
g. actuate a user interface object, such as an icon, flagging the presently displayed problem kernel or a selected problem kernel as not pertinent to the search or otherwise not subject to further processing or to simply skip to the next problem kernel display;
h. actuate a user interface object, such as an icon or clicking on the problem kernel being displayed or a selected problem kernel to cause the system to display more of the document associated with that problem kernel, such as surrounding paragraphs or the entire document, optionally using user-selected display parameters; and
i. actuate a user interface object, such as an icon, causing the system to list or export the flagged problem kernels.

Much of the text describing the embodiments shown in FIGS. 1-9 are directed toward finding individual unmet technical needs and/or technical problems for specific technologies, i.e., the user query input. This embodiment and other exemplary embodiments are not so limited and can be used to identify potentially high value opportunities across all technologies (or perhaps limited by user queries), analyze a corporation for a potential supplier, partner, or acquirer, identify potential prospect companies for acquisition or partnership, etc.

In some exemplary embodiments, a user seeking to identify the unmet technical needs and/or technical problems of a specific corporation performs the following (not necessarily at the same time; some of this could be done beforehand or later or by default; any subset of the steps would be used in some exemplary embodiments):
a. select one or more source document databases;
b. select a user display option, such as having the system automatically identify problem kernels, scored them, rank them, and display them using user-selected display parameters, e.g., KWIC with user-selected display parameters for serious issue words, characteristic words, and document-specific words;
c. enter user query words into a user interface to narrow the scope of the analysis, such as one or more corporations or normalized assignee codes and optionally a technical area (which technical area might correspond to a particular business unit of the specific corporation);
d. actuate a user interface object, such as an icon, initiating the automatic filtering of the documents using the user query words and automatic analysis of the documents meeting the user query criteria, including filtering the documents based on being owned by or mentioning the specific corporation, to automatically identify problem kernels using serious issue words and characteristic words from their respective databases;
e. examine on a computer display one or more problem kernels of the corporation displayed using the user-selected display parameters;
f. actuate a user interface object, such as an icon, flagging the presently displayed problem kernel or a selected problem kernel as pertinent to the search or otherwise subject to further processing in causing the system to display the next problem kernel display;
g. actuate a user interface object, such as an icon, flagging the presently displayed problem kernel or a selected problem kernel as not pertinent to the search or otherwise not subject to further processing or to simply skip to the next problem kernel display;
h. actuate a user interface object, such as an icon or clicking on the problem kernel being displayed or a selected problem kernel to cause the system to display more of the document associated with that problem kernel, such as surrounding paragraphs or the entire document, optionally using user-selected display parameters; and
i. actuate a user interface object, such as an icon, causing the system to list or export the flagged problem kernels for that corporation.

Figure 10:
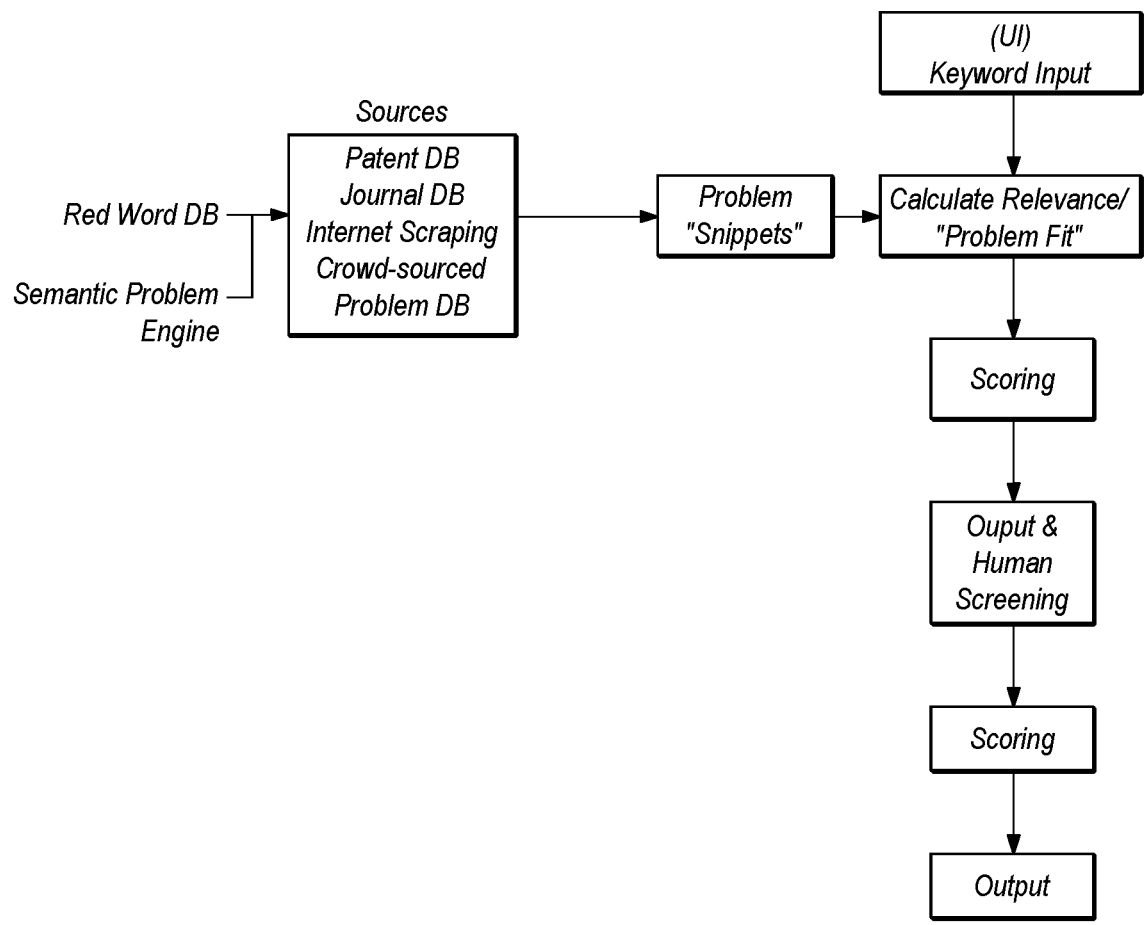
FIG. 10 is a data flow diagram for exemplary embodiments.

Referring now to FIG. 10, a data flow diagram is shown for other exemplary embodiments. In this embodiment, potentially high value opportunities across virtually all technologies can be automatically identified. In FIG. 10, the semantic engine corresponds to the scoring logic 24, described above, and the red word database corresponds to the serious issue identifier database 20, described above. The various sources correspond to numerous document source databases 94 and the problem kernels correspond to the various portions of ranked, scored documents (with scores above a certain threshold), such as the kernels of key words in context (KWIC) text shown in FIG. 4. In the embodiment of FIG. 10, however, the problem kernels are not displayed to a user until later in the process. In contrast with FIG. 2, the system of FIG. 10 identifies many, many problem kernels (perhaps across numerous technologies) which are further processed before being displayed to a user. In the area labeled calculate relevance/problem fit, a computer automatically (algorithmically) analyzes the identified problem kernels (or the entire text of the highest ranked documents) to determine which have the highest relevance or fit a particular problem the best. In exemplary embodiments this is done using any one or any two or more of the following: Keyword Search, TF-IDF (Term Frequency-Inverse Document Frequency, Co-Occurrence, and Topic Modeling approaches like LDA (Latent Dirichlet Allocation), etc. Exemplary systems use the Keyword Search and to identify which problem kernels include the keywords included in the user's query and sorting kernels by the frequency of the keyword's occurrence. Exemplary systems use the TF-IDF algorithm to automatically calculate relevance/problem fit as follows: searching for the frequency queried keywords in problem kernels and, prior to sorting kernels, weighting key words in the query more or less based on how common they are to kernels in the corpus, then sorting based on the TF-IDF score. Exemplary systems use the Co-Occurrence method to automatically calculate relevance/problem fit as follows: analyzing the corpus of kernels and creating a co-occurrence matrix containing each unique word in the kernel corpus and the frequency that other unique words in the corpus co-occur with that word within a pre-defined proximity, and then identifying kernels with words that co-occur with the queried keywords, and sorting them based on the number of co-occurring words and their frequency. Exemplary systems use Topic Modeling approaches, such as Latent Dirichlet Allocation (LDA) to automatically calculate relevance/problem fit as follows: analyzing the corpus of kernels, clustering co-occurring words in those kernels into topics, creating a matrix of topics containing, for each topic, the words associated with that topic and their frequency of co-occurrence, identifying the topics associated with the queried keywords based on the frequency of the keywords in those topics, and then identifying kernels that contain the most words with the highest frequency to the various topics. The output of this step is a list of the problem kernels/documents with a corresponding relevance score and/or problem fit score.

As shown next in FIG. 10, these kernels/documents are then scored (and ranked) and then displayed to the user, for example, as done in step 42 of FIG. 2 (e.g., FIG. 4). The human screening in FIG. 10 corresponds to the user flagging documents of particular interest, e.g., flagging documents that actually describe technical issues, described above. The screened (flagged) kernels/documents are next scored using any one or any two or more of the following: automated calculation of problem intensity, user's assessment of the likely severity or importance of the issue, ability to be addressed with substitute technology of interest, likely market size and growth of the application/industry, etc. As shown next in FIG. 10, these flagged kernels/documents are then scored (and ranked) and then displayed to the user, for example, as done in step 42 of FIG. 2 (e.g., FIG. 4). Thus, the system of FIG. 10 can be used to identify potentially high value technical issues across numerous technologies. In exemplary embodiments, problem intensity can be automatically calculated as follows, e.g.: Cooperative Patent Classification (CPC) analysis (analysis of all patents/applications with the same CPC as a document of interest or a document containing a problem kernel), correlated problem kernel analysis (analysis of all patents/applications expressing substantially the same problem kernel, as discussed elsewhere herein), assignee analysis, etc. In exemplary embodiments, trends over time are automatically calculated and analyzed over N years, e.g., five or ten or twenty years, for trends, such as steadily increasing year after year, steadily decreasing year after year, cyclic, periodic with an approximate period of N, periodic with an approximate period of N (and currently rising or falling based on the period and most-recent data), steadily persistent problem over the years, random changes, follows one or more economic indicators, inversely related to one or more economic indicators, follows the average of all filings/grants, inversely related to the average of all filings/grants, mostly assigned to individuals, mostly assigned to corporations, at the beginning of the relevant period mostly assigned to individuals and at the end of the relevant period mostly assigned to corporations, at the beginning of the relevant period assigned to corporations and at the end of the relevant period assigned to corporations, numbers of documents across all document types, numbers of documents of only one document type (e.g., journals but not patents), in specific document types (in patents or in specific journals), etc. In exemplary embodiments, a user interface provides a user with the ability to selectively choose one or more of all these options, e.g., increasing trends being weighted higher from a problem intensity standpoint, which can increase the likelihood a particular problem kernel will be scored high enough rise to the point that it is displayed, depending on user display settings.

In the alternative, the embodiment of FIG. 10 can be more focused, i.e., identify potentially high value technical issues in a single technical area, e.g., by limiting the result set using a user query. The optional user interface (UI), e.g., keyboard input (shown in red in FIG. 10), corresponds to a user query input, which can be used to filter the kernels, similar to filtering step 34, except in FIG. 10 it is applied to filter the kernels/documents later in the process than step 34 in FIG. 2.

Figure 11:
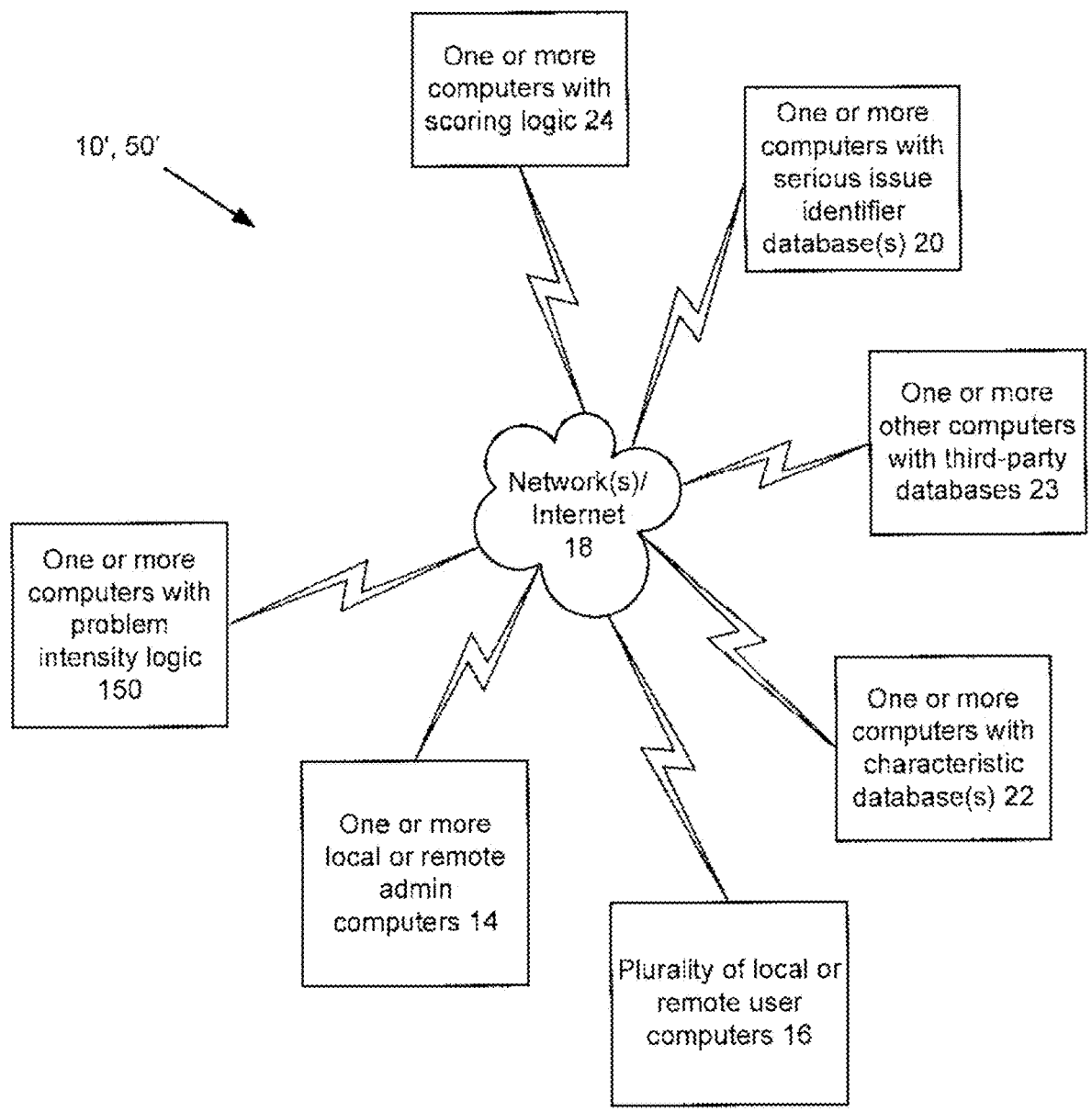
FIG. 11 is a schematic block diagram of another exemplary system.

As shown schematically in FIG. 11, in some exemplary embodiments, the systems 10, 50 also include one or more computers with problem intensity logic 150. In general, problem intensity logic 150 analyzes documents and determines the magnitude of technical issues/problem kernels. In exemplary embodiments, technical issues/problem kernels with a higher intensity are more relevant than technical issues with a lower intensity, i.e., technical issues with a higher intensity might indicate a higher need in the marketplace or simply a bigger market for any solution to that technical issue. In general, problem intensity logic 150 analyzes kernels/documents in the aggregate, determining which occur in more kernels/documents. In some exemplary embodiments, problem intensity logic 150 calculates problem intensity by any one of or any two or more of: the average number of documents in a given problem area over a time period, the growth and/or persistence/recency of documents over that time period, the commercial relevance associated with different types of document sources, the importance of the specific sources/publications, the importance of the specific companies/organizations that are actively discussing these topics, etc. In exemplary embodiments, a value representing the average number of documents in a given problem area over a time period is automatically calculated as follows: after normalizing data via standard deviation from the mean of the entire dataset in the database, the average number of documents in a given problem area over a time period, e.g., 1, 5, 10, or N years, can be calculated. In exemplary embodiments, a value representing the growth and/or persistence/recency of documents over that time period is automatically calculated as follows: after normalizing data via standard deviation from the mean of the entire dataset in the database, the change in the number of documents in a given problem area over a time period, e.g., 1, 5, 10, or N years, can be calculated over the entire time period or compared to recent changes in number of documents. In exemplary embodiments, a value representing the commercial timing associated with different document types (e.g., patents, scientific journals, financial documents) is calculated as follows: each document type is analyzed for its correlation between publication date for a given topic and the dates of first relevant commercial activity and scored with a relative value. In exemplary embodiments, a value representing the commercial relevance associated with different types of document sources is calculated as follows: each document type (patents, scientific journals, etc.) is analyzed for its correlation between publication activity for a given topic and the likelihood of relevant commercial activity and scored with a relative value, the total value can then be scaled with respect to the total number of documents, if desired. In exemplary embodiments, a value representing the number and importance of the specific companies/organizations that are actively discussing these topics is automatically calculated using one or more combinations of the number of companies publishing, the average revenues or market capitalizations of the companies publishing, their approximate market shares in select industries, etc. (e.g., the number of public companies active in the area; one can also use the company revenues or market caps to scale this number further). Some of the foregoing rely on normalization of problem kernels and aggregation of problem kernels, i.e., recognizing that two different problem kernels in two different documents actually present essentially the same technical problem or unmet technical need (normalizing them) and aggregating the documents presenting essentially the same technical problem or unmet technical need, e.g., by adding data to a field in each indicating that they present essentially the same technical problem or unmet technical need or by linking the documents as being related or by simply incrementing a counter for that normalized technical problem or unmet technical need. Automatically recognizing that two different problem kernels in two different documents actually present essentially the same technical problem or unmet technical need can be done using the correlation algorithms discussed herein. All of the algorithms herein have processor code associated therewith the cause the one or more processors to use the algorithm to analyze the documents or data as indicated.

In some exemplary embodiments, problem intensity logic 150 is used upstream of any user flagging to filter documents as part of the upstream processes before ranked, scored documents (candidate documents) are shown to a user or flagged by a user. In other exemplary embodiments, problem intensity logic 150 is used downstream of a user flagging documents to rank flagged candidate documents (i.e., rank documents flagged by a user as actually indicating a problem) by the intensity of the problem. In still other exemplary embodiments, problem intensity logic 150 is used both upstream and downstream of a user flagging documents to both filter documents by problem intensity and rank flagged candidate documents by problem intensity.

Looked at in the context of FIG. 2, in some exemplary embodiments, problem intensity logic 150 is used to help filter documents as part of a filtering step 34 before documents are analyzed, scored, and ranked. Thus, in some exemplary embodiments, problem intensity logic 150 is used upstream of any user flagging to filter documents as part of the upstream processes before ranked, scored documents (candidate documents) are shown to a user or flagged by a user.

Figure 12:
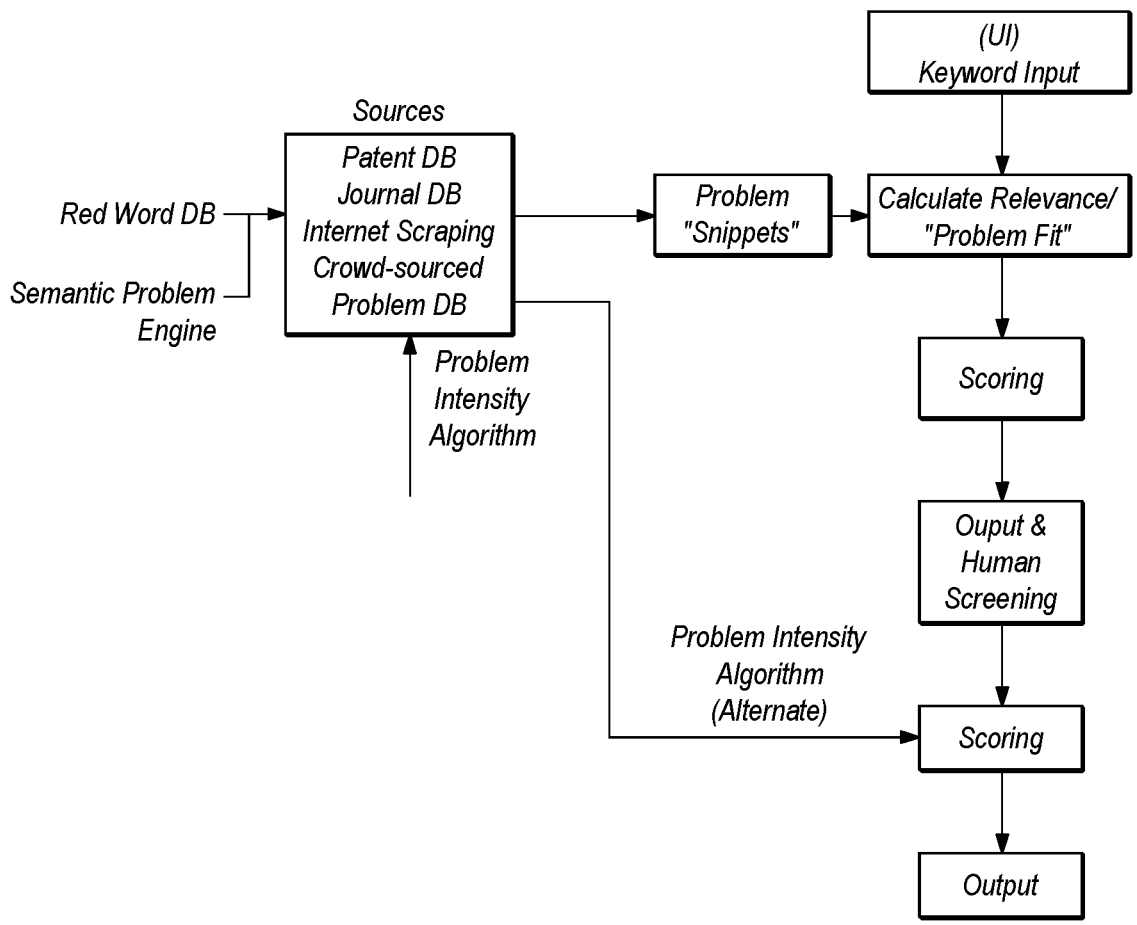
FIG. 12 is another data flow diagram for other exemplary embodiments.

FIG. 12 is the same as FIG. 10, described above, except it includes the use of problem intensity logic 150 at one or two points in the process. Referring now to FIG. 12, problem intensity logic 150 is used either upstream, or downstream, or both upstream and downstream of a user flagging documents to both filter documents by problem intensity and rank flagged candidate documents by problem intensity.

In some exemplary embodiments, the user query is input by a user using a structured inquiry. For example, the following set of structured questions would typically yield a more helpful user query word set than a wide open search field: What do you sell? What kind? What is special about yours? What else is special about yours? An exemplary session might include:

What do you sell? Polymers
What kind? Elastomers
What is special about your elastomers? Temperature stability
What else is special about your elastomers? Abrasion resistance
What else is special about your elastomers? Done Accordingly, the terms elastomer, temperature stability, abrasion resistance (and perhaps synonyms) would be used as a query to filter the documents (or kernels) at any of the various parts of the various respective processes. Virtually all of the embodiments herein optionally use structured questions leading to robust user query data.

In some exemplary embodiments, a user seeking to identify high-value unmet technical needs and/or technical problems performs the following (not necessarily at the same time; some of this could be done beforehand or later or by default; any subset of the steps would be used in some exemplary embodiments):

a. select one or more source document databases;
b. select a user display option, such as having the system automatically identify problem kernels, scored them, rank them, and display them using user-selected display parameters, e.g., KWIC with user-selected display parameters for serious issue words, characteristic words, and document-specific words;
c. using a user-interface, select filtering criteria, including at value of the problem kernel, optionally, the intensity of the problem kernel, and, optionally, aggregation of problem kernels for problem kernel valuation purposes and problem kernel intensity purposes;
d. enter user query words into a user interface to narrow the scope of the analysis, e.g., "coatings";
e. actuate a user interface object, such as an icon, initiating the automatic filtering of the documents using the user query words, automatic analysis of the documents meeting the user query criteria to automatically identify problem kernels using serious issue words and characteristic words from their respective databases, automatically aggregate identified problem kernels, automatically calculate the relative monetary value of aggregated problem kernels, automatically calculate the intensity of aggregated problem kernels, and sort the problems kernels using all these;
f. examine on a computer display one or more problem kernels displayed using the user-selected display parameters;
g. actuate a user interface object, such as an icon, flagging the presently displayed problem kernel or a selected problem kernel as pertinent to the search or otherwise subject to further processing in causing the system to display the next problem kernel display;
h. actuate a user interface object, such as an icon, flagging the presently displayed problem kernel or a selected problem kernel as not pertinent to the search or otherwise not subject to further processing or to simply skip to the next problem kernel display;
i. actuate a user interface object, such as an icon or clicking on the problem kernel being displayed or a selected problem kernel to cause the system to display more of the document associated with that problem kernel, such as surrounding paragraphs or the entire document, optionally using user-selected display parameters; and
j. actuate a user interface object, such as an icon, causing the system to list or export the flagged problem kernels.

Some of the exemplary embodiments herein use correlation of documents or problem kernels setting forth substantially the same unmet technical need and/or technical problem. In some exemplary systems, the Topic Modelling approaches, such as Latent Dirichlet Allocation, etc. Some exemplary systems use Topic Modeling to identify other documents or problem kernels having essentially the same unmet technical need and/or technical problem as follows:

analyzing the corpus of kernels, clustering co-occurring words in those kernels into topics, creating a matrix of topics containing, for each topic, the words associated with that topic and their frequency of co-occurrence, identifying the topics associated with the queried keywords based on the frequency of the keywords in those topics, and then identifying kernels that contain the most words with the highest frequency to the various topics. The correlated documents or problem kernels (that is, those documents or problem kernels having a high enough numerical correlation score relative to a correlation threshold vis-à-vis base documents or problem kernels) can be aggregated with the base documents or problem kernels for various aggregate analyses, as described herein. These are preferably done automatically and behind the scenes so that without user intervention, these aggregated calculations can be used to rank documents presented to the user. All of the algorithms herein have processor code associated therewith the cause the one or more processors to use the algorithm to analyze the documents or data as indicated.

All of the foregoing are preferably done automatically and behind the scenes so that without user intervention (except for selecting which algorithms to use via a user interface), these aggregated calculations can be used to rank documents and present them to the user.

Some of the exemplary embodiments herein use valuation of documents or problem kernels as part of automatically scoring and ranking documents or problem kernels. In some exemplary systems, the following are used to calculate a numeric value indicating the relative monetary values particular documents or problem kernels: document assignee analysis, Cooperative Patent Classification (CPC) assignee analysis, noun valuation analysis, etc. In some exemplary systems, companies, CPC codes, and/or applications (nouns) are all manually given numerical values that indicate the monetary value of a document or problem kernel associated with that company, CPC code and/or application. These can be stored in a monetary value database and searched to locate a monetary value for a company, CPC code, or application (noun).

Some exemplary systems use document assignee analysis to automatically calculate a monetary value of a document or problem kernel as follows: (a) determine the assignee of the document at issue or the document containing the problem kernel at issue (this can often be found for patents and patent applications on various publicly available databases); and (b) determine an entity monetary value pertinent to the assignee of the document at issue or the document containing the problem kernel at issue, such as the market capitalization of the entity, growth of the entity, revenue of the entity, etc. The resulting monetary values can be compared to each other to help rank the documents if the user has indicated that the monetary value should be used as a filter criteria or a ranking criteria.

Some exemplary systems use CPC assignee analysis to automatically calculate a monetary value of a document or problem kernel as follows: (a) determine the primary CPC of the document at issue or the document containing the problem kernel at issue (this can often be found for patents and patent applications on various publicly available databases); (b) determine the assignees of all of the patents and/or patent applications having that CPC as its primary CPC; (c) determine the top N (top 5, top 10, top 25, etc.) assignees for that CPC in terms of sheer numbers of patents and/or patent applications in that CPC; (d) determine an entity monetary value pertinent to the various assignees of the documents in that CPC, such as the market capitalization of the entities, growth of the entities, revenue of the entities, etc.; and (e) determine a corresponding numerical value, e.g., by (i) scaling the entity monetary values of the top N entities by the percentage of documents among the top N entities (e.g., use 10% of the market capitalization of an entity having 10% of the patents among the top N entities) or by (ii) using the highest entity monetary value of the top N entities. The resulting monetary values can be compared to each other to help rank the documents if the user has indicated that the monetary value should be used as a filter criteria or a ranking criteria.

Some exemplary systems use noun valuation analysis to automatically calculate a monetary value of a document or problem kernel as follows: (a) determine one or more nouns associated with the document at issue or the problem kernel at issue; (b) determine a value associated with each of the nouns; and (c) select the value of the highest dollar value noun to represent the value of the document at issue or the problem kernel at issue. The resulting monetary values can be compared to each other to help rank the documents if the user has indicated that the monetary value should be used as a filter criteria or a ranking criteria. As to step (a), as an example, Problem Kernel 2 mentions at least the following nouns in that problem kernel: lubricant, turbine, chambers, oil, etc. In exemplary embodiments, the identified nouns are expanded when needed using one or two adjectives in the document at issue or the document containing the problem kernel. For example, as an example, US2011/0293404A1, which contains Problem Kernel 2, describes the turbine as a "hydroelectric turbine" in the title. As another example of step (a), Problem Kernel 1 mentions at least the following nouns in that problem kernel: handpiece [sic], suspension rings, etc. As to adjectives, US2007/0238067A1, which contains Problem Kernel 1, describes the handpiece as a "dental handpiece" in the title.

As to step (b), valuation of the nouns sufficient to permit sorting, several options are available, such as (i) using SIC codes and/or NAICS codes and determining one or more company valuations based on the value (e.g., market capitalization) of the top companies associated with that SIC codes and/or NAICS codes; (ii) automatically analyzing data extracted from various shopping web sites, etc.

Figure 13:
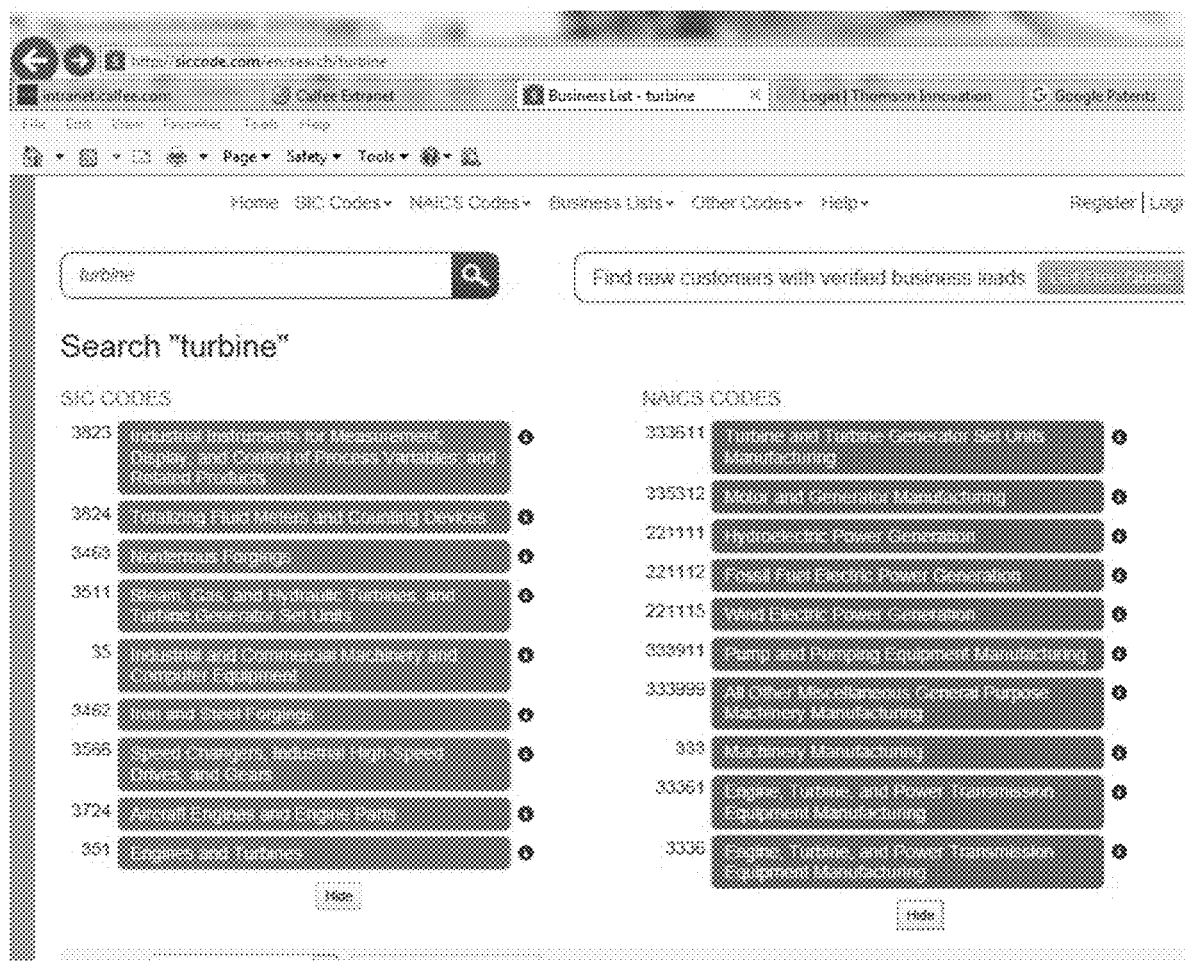
FIGS. 13 and 14 show an exemplary way of determining automatically SIC codes and/or NAICS codes corresponding to problem kernels.
Figure 14:
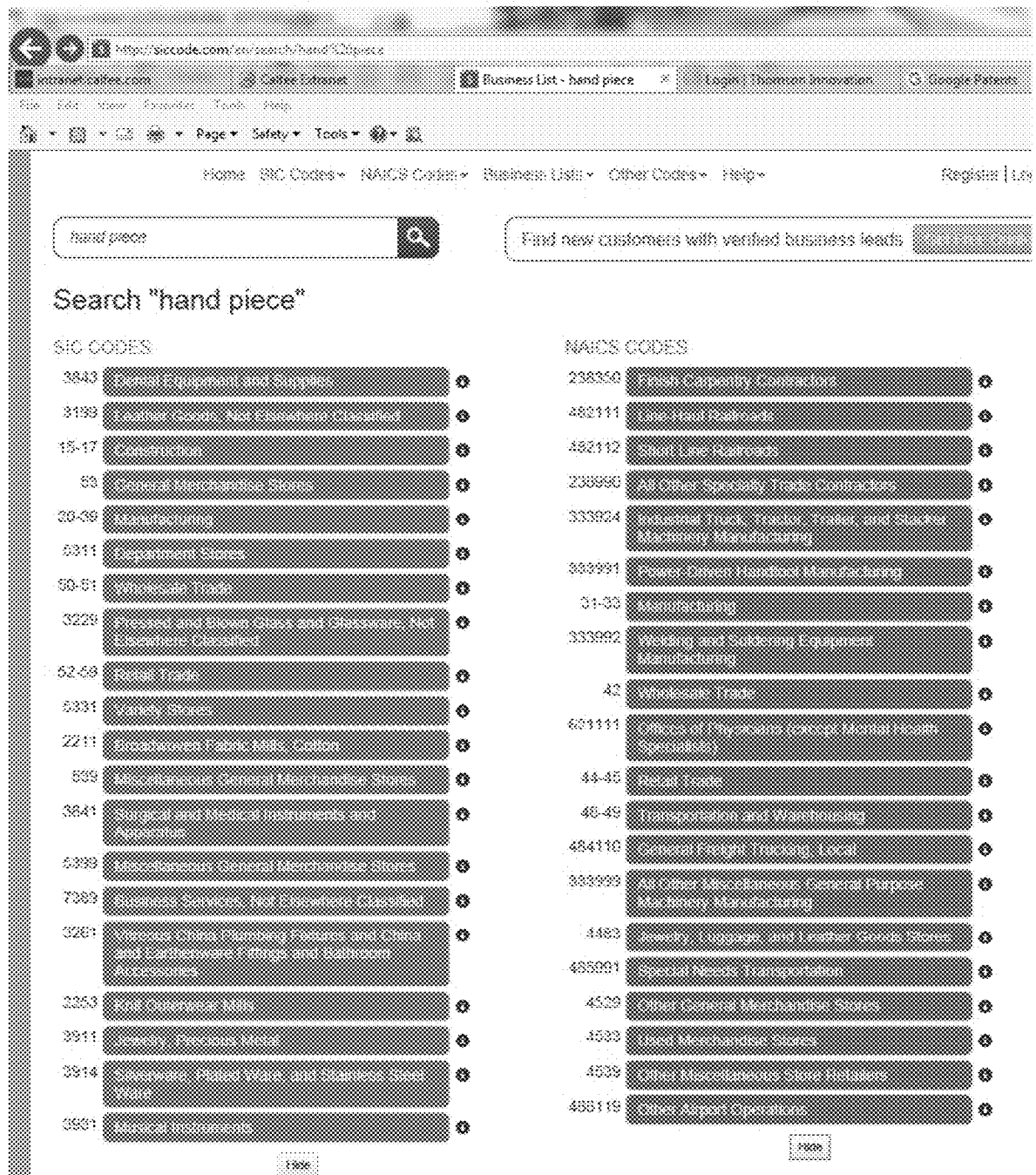

As an example of (i), exemplary systems automatically submit extracted nouns and perhaps adjectives to SIC/NAICS code identifying web sites, as shown in FIGS. 13-14 to determine problem kernel values, which values are used to rank problem kernels if a user has turned on that option. In FIG. 13 the system has automatically submitted the noun "turbine" as a query search term; scanning the results for adjectives finds "hydroelectric" associated with NAICS code 221111 (weighted analysis of nouns and adjectives relating to turbine from that document would causes hydroelectric to have a higher correlation, e.g., in the title proximate the noun, etc.). Companies associated with this NAICS code 221111 can be valued, as set forth elsewhere herein, and used to rank problem kernels by value, subject to user options. In FIG. 14 the system has automatically submitted the noun "hand piece" (more common spelling of handpiece used in Problem Kernel 1, as determined by an auto-correction database after getting zero hits for handpiece) as a query search term; scanning the results for adjectives finds "dental" associated with SIC code 3843 (weighted analysis of nouns and adjectives relating to handpiece from that document would causes dental to have a higher correlation, e.g., in the title proximate the noun, etc.). Companies associated with this SIC code 3843 can be valued, as set forth elsewhere herein, and used to rank problem kernels by value, subject to user options.

Figure 15:
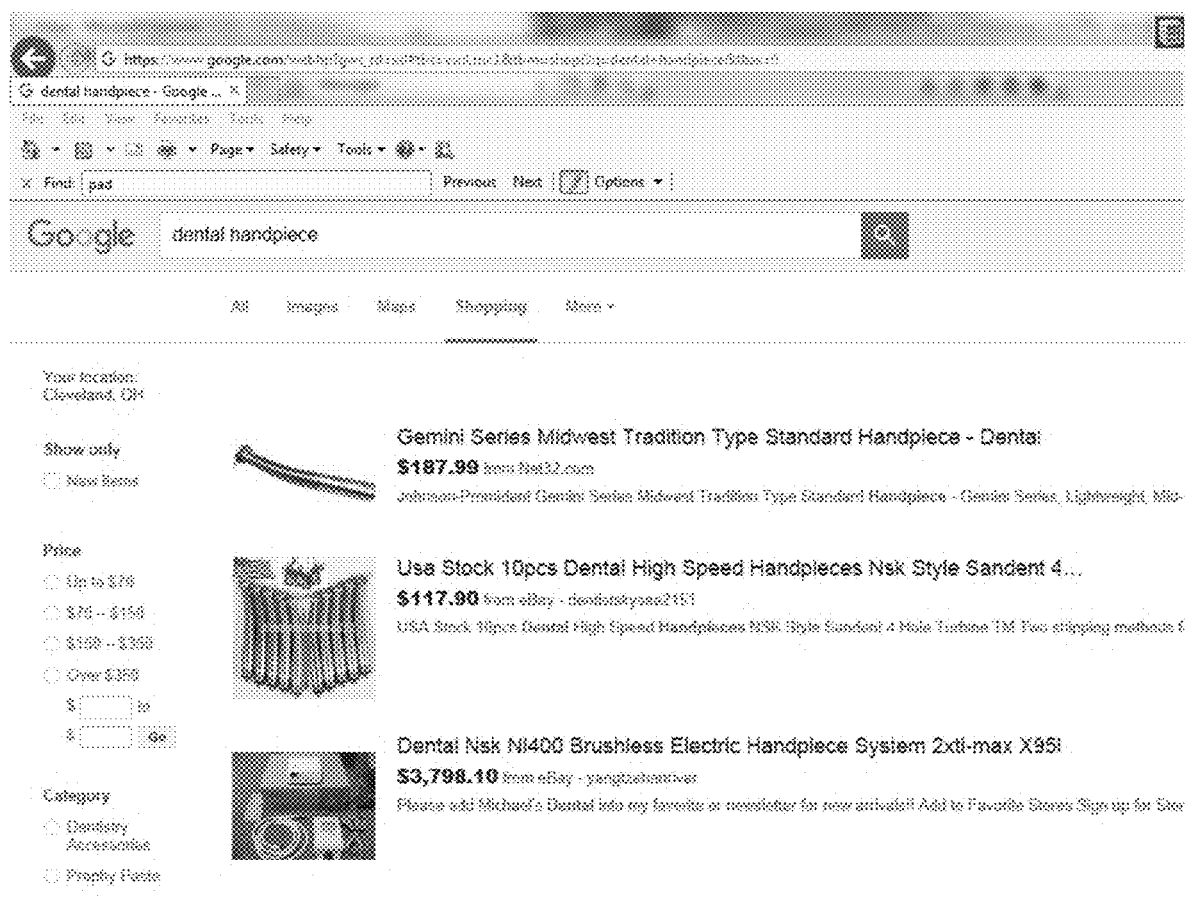
FIGS. 15 and 16 show an exemplary way of automatically determining a value of problem kernels.
Figure 16:
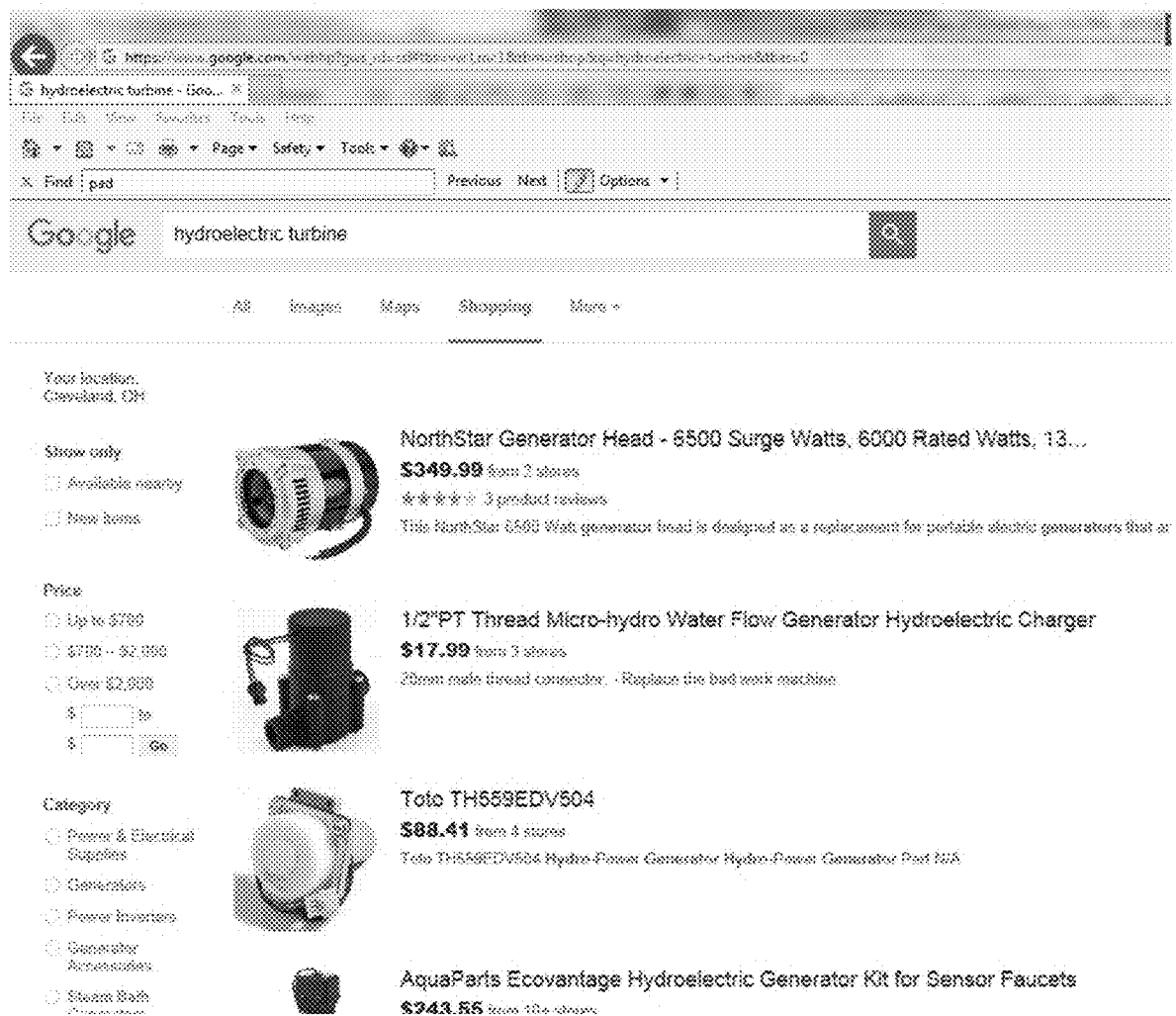

As an example of (ii), exemplary systems automatically submit extracted nouns to shopping web sites, such as Google Shopping, to get relative value for the nouns identified in the problem kernels (or elsewhere in documents containing problem kernels, e.g., in the claims or the abstract or other portion), which values are used to rank problem kernels if a user has turned on that option. Referring now to FIGS. 15-16, the system has automatically submitted the nouns and adjectives to Google Shopping, and one can see that Problem Kernel 1 has a lower value than Problem Kernel 2. More specifically, the highest range at the left for "dental hand piece" in FIG. 15 is $350 and the highest range at the left for "hydroelectric turbine" in FIG. 16 is $2000. Again, a precise valuation is not required; the exemplary embodiments simply need a way of sorting all the various problem kernels to automatically present more pertinent problem kernels to users and approximate value of the nouns provides that. Other ways of valuing the problem kernels can be used.

All of the algorithms herein have processor code associated therewith that cause the one or more processors to use the algorithm to analyze the documents or data as indicated.

In some exemplary embodiments, a user interface is provided to analyze the assignees of documents containing correlated problem kernels, e.g., using one of the above methods herein to identify problem kernels in a specific technical space or problem kernels of an entity and actuating a user interface object to display on a computer display the assignees of documents containing problem kernels correlated to express essentially the same problem kernel.

Some of the steps, acts, and other processes and portions of processes are described herein as being done "automatically." In the alternative, or in addition thereto, those steps, acts, and other processes and portions of processes can be done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the computers 20, 22, 23, 24, 26, 28 and/or computers 14, 16 can be modified to include logic to perform any one or more of the various functions and processes herein. As another example, the steps of all processes and methods herein can be performed in any order, unless two or more steps are expressly stated as being performed in a particular order, or certain steps inherently require a particular order. As yet another example, in exemplary embodiments, machine learning is used to identify serious issue words, identify synonyms, identify characteristic words, identify qualifier words, identify problem kernels, score problem kernels, correlate problem kernels, rank problem kernels, and/or value problem kernels, etc. (e.g., using Topic Modeling. As still yet another example, some exemplary embodiments include a database of applications or nouns or "things" (subset of nouns excluding persons and places), e.g., bearings, turbines, hand pieces, O-rings, fasteners, etc. Accordingly, departures may be made from such details without departing from the spirit or scope of the applicant's general inventive concept.

What is claimed is:

1. A computer implemented method of identifying documents disclosing a serious issue or problem, comprising:
    accessing, over a network, a plurality of documents, the plurality of documents having textual elements;
    analyzing with a processor textual elements of a document of the plurality of documents to identify one or more problem kernels, wherein a problem kernel comprises at least one phrase expressing a technical problem or unmet technical need;
    scoring at least one portion of the document, the scoring comprising at least calculating with the processor a problem kernel likelihood score based on:
        (a) a number of serious issue words in the at least one portion of the document, wherein the serious issue words indicate a serious issue or problem, and
        (b) proximity between the number of serious issue words and characteristic words in the at least one portion of the document, wherein the characteristic words indicate a generic characteristic of a thing;
    automatically calculating with the processor a relative or absolute problem intensity number for at least the text of the at least one portion of the document, wherein the problem intensity number is based on at least the identified problem kernel likelihood score and a trend associated with a serious issue or problem;
    ranking the at least one portion of the document against other documents or portions thereof based on the problem kernel likelihood score of the at least one portion of the document; and
    generating a visual interface identifying documents disclosing a likely problem kernel based on the ranking.

2. The computer implemented method of identifying documents disclosing a serious issue or problem according to claim 1, further comprising providing a user interface with which a user can, for one or more documents meeting user query input that have been sorted or filtered taking into account at least problem kernel likelihood score, display on a computer display at least the text of the one or more documents to which the problem kernel likelihood score applies.

3. The computer implemented method of identifying documents disclosing a serious issue or problem according to claim 1, further comprising automatically calculating with the processor based at least on the on the text of the at least one portion of the document a relative or absolute monetary valuation number indicating a monetary value associated with the identified problem kernel likelihood score and storing to a data storage device the monetary valuation number for the at least one portion of the document.

4. The computer implemented method of identifying documents disclosing a serious issue or problem according to claim 1, wherein the problem kernel likelihood score is additionally based on a seriousness value of the number of serious issue words.

5. A computer implemented method of identifying documents disclosing a serious issue or problem, comprising:
    accessing, over a network, a plurality of documents, the plurality of documents having textual elements;
    analyzing with a processor textual elements of a document of the plurality of documents to identify one or more problem kernels, wherein a problem kernel comprises at least one phrase expressing a technical problem or unmet technical need;
    scoring at least one portion of the document, the scoring comprising at least calculating with the processor a problem kernel likelihood score based on:

(a) a number of serious issue words in the at least one portion of the document, wherein the serious issue words indicate a serious issue or problem, and (b) proximity between the number of serious issue words and characteristic words in the at least one portion of the document, wherein the characteristic words indicate a generic characteristic of a thing;

one of automatically calculating with the processor based at least on the on the text of the at least one portion of the document a monetary valuation number indicating a relative or absolute monetary value associated with the identified problem kernel likelihood score and storing to a data storage device the monetary valuation number for the at least one portion of the document; and automatically calculating with the processor based at least on the text of the at least one portion of the document a relative or absolute problem intensity number based on at least the identified problem kernel likelihood score and a trend associated with a serious issue or problem; and, providing a user interface with which a user can display information about a plurality of documents that have been sorted or filtered taking into account at least their problem kernel likelihood score and one of their monetary valuation number and their problem intensity number.

6. A computer implemented method of identifying documents disclosing a serious issue or problem, comprising:

reading a serious issue identifier database having words indicating a serious issue or problem;

accessing, over a network, a plurality of documents, the plurality of documents having textual elements;

analyzing textual elements of a document of the plurality of documents to identify one or more problem kernels, wherein a problem kernel comprises at least one phrase expressing a technical problem or unmet technical need and scoring the at least one portion of the document, the scoring comprising at least calculating a problem kernel likelihood based on:

a number of serious issue words in the at least one portion of the document, wherein the serious issue words indicate a serious issue or problem, and proximity between the number of serious issue words and characteristic words in the at least one portion of the document, wherein the characteristic words indicate a generic characteristic of a thing;

automatically calculating a relative or absolute problem intensity number for at least the text of the at least one portion of the document, wherein the problem intensity number is based on at least the identified problem kernel likelihood score and a trend associated with a serious issue or problem;

ranking the at least one portion of the document against other documents or portions thereof based on the problem kernel likelihood score of the at least one portion of the document;

generating a visual interface identifying documents disclosing a likely problem kernel based on the ranking.

7. The computer implemented method of identifying documents disclosing a serious issue or problem according to claim 6, wherein the storing step comprises storing on the data storage device (a) the problem kernel likelihood score for the at least one portion of the document and (b) a location indicator identifying to which text in the document the problem kernel likelihood score applies.

8. The computer implemented method of identifying documents disclosing a serious issue or problem according to claim 6, further comprising performing the method of claim 6 on a plurality of documents to generate a problem kernel likelihood score database stored on a data storage device storing a problem kernel likelihood score for a plurality of documents.

9. The computer implemented method of identifying documents disclosing a serious issue or problem according to claim 8, further comprising providing a user interface with which a user can, for one or more documents meeting user query input that have been sorted or filtered taking into account at least problem kernel likelihood score, display on a computer display at least the text of the one or more documents to which the problem kernel likelihood score applies.

10. The computer implemented method of identifying documents disclosing a serious issue or problem according to claim 6, further comprising:

automatically calculating with the processor based at least on the on the text of the at least one portion of the document a monetary valuation number indicating a relative or absolute monetary value associated with the identified problem kernel likelihood score and storing to a data storage device the monetary valuation number for the at least one portion of the document; and providing a user interface with which a user can display information about a plurality of documents that have been sorted or filtered taking into account at least their problem kernel likelihood score and their monetary valuation number.

11. The computer implemented method of identifying documents disclosing a serious issue or problem according to claim 6, further comprising:

storing to a data storage device the problem intensity number for the at least one portion of the document; and providing a user interface with which a user can display information about a plurality of documents that have been sorted or filtered taking into account at least their problem kernel likelihood score and their problem intensity number.

12. The computer implemented method of identifying documents disclosing a serious issue or problem according to claim 6, wherein the problem kernel likelihood score is additionally based on a seriousness value of the number of serious issue words.

13. The computer implemented method of identifying documents disclosing a serious issue or problem according to claim 12, wherein the seriousness value is combined with the problem intensity number.

14. A computer implemented method of generating an image on an electronic display, comprising:

accepting user query input;

querying a database to identify documents that meet the user query input, including synonyms from a synonym database, if applicable;

reading a serious issue identifier database having words indicating a serious issue or problem;

accessing, over a network, a plurality of documents, the plurality of documents having textual elements;

analyzing textual elements of documents to identify one or more problem kernels, wherein a problem kernel comprises at least one phrase expressing a technical problem or unmet technical need and scoring at least one portion of the documents, the scoring comprising at least calculating a problem kernel likelihood based on:

a number of serious issue words in the at least one portion of the documents wherein the serious issue words indicate a serious issue or problem, and;

proximity between the number of serious issue words and characteristic words in the at least one portion of the documents, wherein the characteristic words indicate a generic characteristic of a thing;

automatically calculating with a processor a relative or absolute problem intensity number for at least the text of the at least one portion of the document, wherein the problem intensity number is based on at least the identified problem kernel likelihood score and a trend associated with a serious issue or problem;

identifying and ranking candidate documents based at least on the problem kernel likelihood score of the at least one portion of the documents;

providing a user interface for user to view the ranked candidate documents; and, displaying at least one portion of a ranked candidate document on a computer display in which serious issue words are shown in one set of display characteristics and other words are shown in a different set of display characteristics.

15. The computer implemented method of identifying documents disclosing a serious issue or problem according to claim 14, further comprising:

automatically calculating with the processor based at least on the on the text of the at least one portion of the documents a monetary valuation number indicating a relative or absolute monetary value associated with the identified problem kernel likelihood score and storing to a data storage device the monetary valuation number for the at least one portion of the documents; and providing a user interface with which a user can display information about a plurality of documents that have been sorted or filtered taking into account at least their problem kernel likelihood score and one of their monetary valuation number and their problem intensity number.

* * * * *